(12) United States Patent
Yoshida

(10) Patent No.: US 11,665,534 B2
(45) Date of Patent: May 30, 2023

(54) COMMUNICATION METHOD BETWEEN A TERMINAL AND AN ACCESS POINT

(71) Applicant: Panasonic Intellectual Property Corporation of America, Torrance, CA (US)

(72) Inventor: Moe Yoshida, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 165 days.

(21) Appl. No.: 17/241,677

(22) Filed: Apr. 27, 2021

(65) Prior Publication Data
US 2021/0250760 A1 Aug. 12, 2021

Related U.S. Application Data

(63) Continuation of application No. PCT/JP2019/039926, filed on Oct. 9, 2019.
(Continued)

(30) Foreign Application Priority Data

Apr. 25, 2019 (JP) .............................. JP2019-084337

(51) Int. Cl.
*H04W 12/0433* (2021.01)
*H04W 12/0431* (2021.01)
*H04W 12/03* (2021.01)

(52) U.S. Cl.
CPC ....... *H04W 12/03* (2021.01); *H04W 12/0431* (2021.01); *H04W 12/0433* (2021.01)

(58) Field of Classification Search
CPC . H04W 12/0431; H04W 12/03; H04W 12/08; H04W 12/0433; H04L 63/0428;
(Continued)

(56) References Cited

U.S. PATENT DOCUMENTS 7,362,736 B2 * 4/2008 Suzuki ................ H04W 12/062
455/433
7,610,485 B1 * 10/2009 Yadav .................... H04H 20/82
713/169
(Continued)

FOREIGN PATENT DOCUMENTS

CN 1878058 12/2006
EP 1852999 A1 * 11/2007 ......... H04L 63/0823
(Continued)

OTHER PUBLICATIONS

International Search Report (ISR) dated Dec. 24, 2019 in International (PCT) Application No. PCT/JP2019/039926.

*Primary Examiner* — Lizbeth Torres-Diaz
(74) *Attorney, Agent, or Firm* — Wenderoth, Lind & Ponack, L.L.P.

(57) ABSTRACT

A terminal includes: a communicator that wirelessly performs encrypted communication with an access point; a processor; and a memory that stores at least one program executed by the processor and a key management table for storing a group key for the encrypted communication. The processor performs: acquiring the group key from the access point and storing the group key acquired in the key management table as a first group key; receiving a broadcast packet encrypted by the access point via the communicator; making a first determination as to whether the broadcast packet received is decryptable by using the first group key; and when it is determined, in the first determination, that the broadcast packet is not decryptable by using the first group key, generating information indicating that the first group key needs to be updated.

10 Claims, 22 Drawing Sheets

Related U.S. Application Data

(60) Provisional application No. 62/785,399, filed on Dec. 27, 2018.

(58) Field of Classification Search
CPC ....... H04L 9/0891; H04L 63/062; H04L 9/08; H04L 9/0833; H04L 63/065; H04L 9/16
See application file for complete search history.

(56) References Cited

U.S. PATENT DOCUMENTS

| | | | | |
|---|---|---|---|---|
| 7,864,961 B2* | 1/2011 | Won | ...................... | H04L 9/0833 380/277 |
| 8,225,092 B2* | 7/2012 | Lal | ...................... | H04L 63/0823 713/168 |
| 9,871,894 B2* | 1/2018 | Goto | ...................... | H04W 12/50 |
| 2006/0140410 A1* | 6/2006 | Aihara | .................. | H04L 9/0891 380/273 |
| 2010/0250930 A1* | 9/2010 | Csaszar | ............... | H04L 63/0428 713/168 |
| 2010/0254285 A1* | 10/2010 | Okano | ................ | H04L 12/2827 370/254 |
| 2013/0138949 A1* | 5/2013 | Furukawa | ......... | H04W 12/0433 713/153 |
| 2016/0192187 A1* | 6/2016 | Tao | ......................... | H04L 12/18 380/270 |

FOREIGN PATENT DOCUMENTS

| | | | | |
|---|---|---|---|---|
| JP | 4574122 B2 * | 11/2010 | | |
| JP | 2013-207496 | 10/2013 | | |
| JP | 2013207496 A * | 10/2013 | | |
| JP | 2014-6764 | 1/2014 | | |
| JP | 2014006764 A * | 1/2014 | | |
| JP | 5458195 B2 * | 4/2014 | .......... | H04L 63/061 |
| JP | 2015-133589 | 7/2015 | | |
| WO | WO-2011082529 A1 * | 7/2011 | .......... | H04L 63/065 |
| WO | WO-2012073340 A1 * | 6/2012 | .......... | H04L 63/068 |

\* cited by examiner

FIG. 12

| SSID of access point | Encryption information | MAC address of access point | Key information |
|---|---|---|---|
| SSID2 | WPA2-PSK-AES | 33:45:20:65:A9:AA | GTK:A |

COMMUNICATION METHOD BETWEEN A TERMINAL AND AN ACCESS POINT

CROSS REFERENCE TO RELATED APPLICATIONS

This is a continuation application of PCT International Application No. PCT/JP2019/039926 filed on Oct. 9, 2019, designating the United States of America, which is based on and claims priority of Japanese Patent Application No. 2019-084337 filed on Apr. 25, 2019 and U.S. Provisional Patent Application No. 62/785,399 filed on Dec. 27, 2018. The entire disclosures of the above-identified applications, including the specifications, drawings and claims are incorporated herein by reference in their entirety.

FIELD

One or more exemplary embodiments disclosed herein relate generally to a terminal, a communication method, and a recording medium.

BACKGROUND

A device is disclosed that can perform communication even when the update of a group key (also referred to as GTK (Group Temporal Key)) fails (see Patent Literature (PTL) 1).

CITATION LIST

Patent Literature

PTL 1: Japanese Unexamined Patent Application Publication No. 2015-133589

SUMMARY

Technical Problem

However, there is a problem in that a terminal may not be able to decrypt a broadcast packet received from an access point by using a group key provided from the access point. As used herein, the term "broadcast packet" is a broad term that encompasses both concepts of broadcast in a strict sense and multicast in a strict sense. Also, the term "broadcast" alone refers to broadcast in a broad sense.

To address the problem described above, one non-limiting and exemplary embodiment provides a terminal and the like, with which when it is not possible to decrypt a broadcast packet received from an access point, a state can be achieved in which the broadcast packet can be decrypted.

Solution to Problem

A terminal according to one exemplary embodiment includes: a communicator that wirelessly performs encrypted communication with an access point; a processor; and a memory that stores at least one program executed by the processor and a key management table for storing a group key for the encrypted communication, wherein the processor performs: acquiring the group key for the encrypted communication from the access point and storing the group key acquired in the key management table as a first group key; receiving a broadcast packet encrypted by the access point via the communicator; making a first determination as to whether the broadcast packet received is decryptable by using the first group key; and when it is determined, in the first determination, that the broadcast packet is not decryptable by using the first group key, generating information indicating that the first group key needs to be updated.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

With the terminal according to one exemplary embodiment, when it is not possible to decrypt a broadcast packet received from an access point, a state can be achieved in which the broadcast packet can be decrypted.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 12 is an illustrative diagram showing a key management table stored in the terminal according to the embodiment.

DESCRIPTION OF EMBODIMENT

Underlying Knowledge Forming Basis of the Present Invention

In relation to the communication that uses a group key as disclosed in the Background section, the inventors have found the following problem. The cases where a problem arises will be described as Comparative Examples 1 and 2 in sequence.

Comparative Example 1

Figure 1:
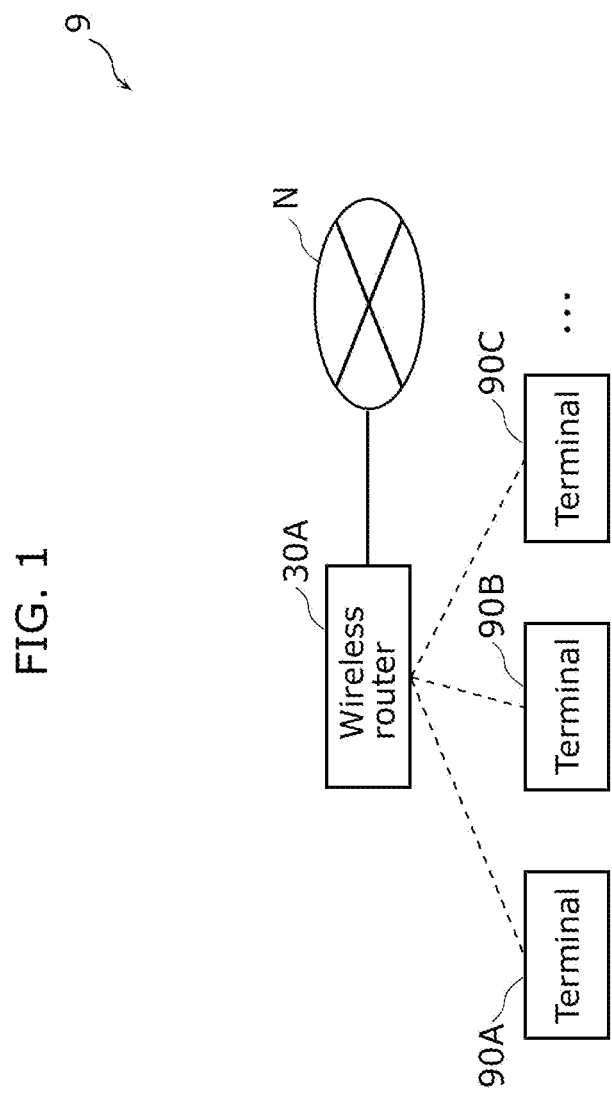
FIG. 1 is a block diagram showing a configuration of a communication system according to Comparative Example 1.

FIG. 1 is a block diagram showing a configuration of communication system 9 according to Comparative Example 1.

As shown in FIG. 1, communication system 9 includes wireless router 30A and terminals 90A, 90B, and 90C (also referred to as terminals 90A and the like).

Wireless router 30A is an access point (AP) or a base station for wireless communication. A wireless communication interface used in wireless router 30A operates in an infrastructure mode as an AP.

Wireless router 30A establishes a wireless connection with each of terminals 90A and the like by using the wireless communication interface, and transmits and receives communication packets (also referred to simply as packets) to and from each of terminals 90A and the like through the established wireless connection. Wireless router 30A transfers, to network N, packets that are addressed to communication devices connected to network N and that have been transmitted from terminals 90A and the like, and also transfers, to terminals 90A and the like, packets that are addressed to terminals 90A and the like and that have been received from network N. Also, wireless router 30A relays packets that are transmitted and received between terminals 90A and the like.

Terminal 90A is a station (STA) or a terminal for wireless communication. A wireless communication interface used in terminal 90A operates in an infrastructure mode as a STA.

Terminal 90A establishes a wireless connection with wireless router 30A by using the wireless communication interface, and transmits and receives packets to and from wireless router 30A through the established wireless connection. Terminal 90A performs communication with a communication device that is connected to network N or terminal 90B or 90C, which is another terminal connected to wireless router 30A, via wireless router 30A. Terminal 90A may be any device as long as it is possible to perform communication, and may be a computer, a smartphone, a device (an electric household appliance, industrial equipment, or office equipment) that has a communication function, or the like.

Terminals 90B and 90C each have the same function as that of terminal 90A, and operate independently of terminal 90A.

Figure 2:
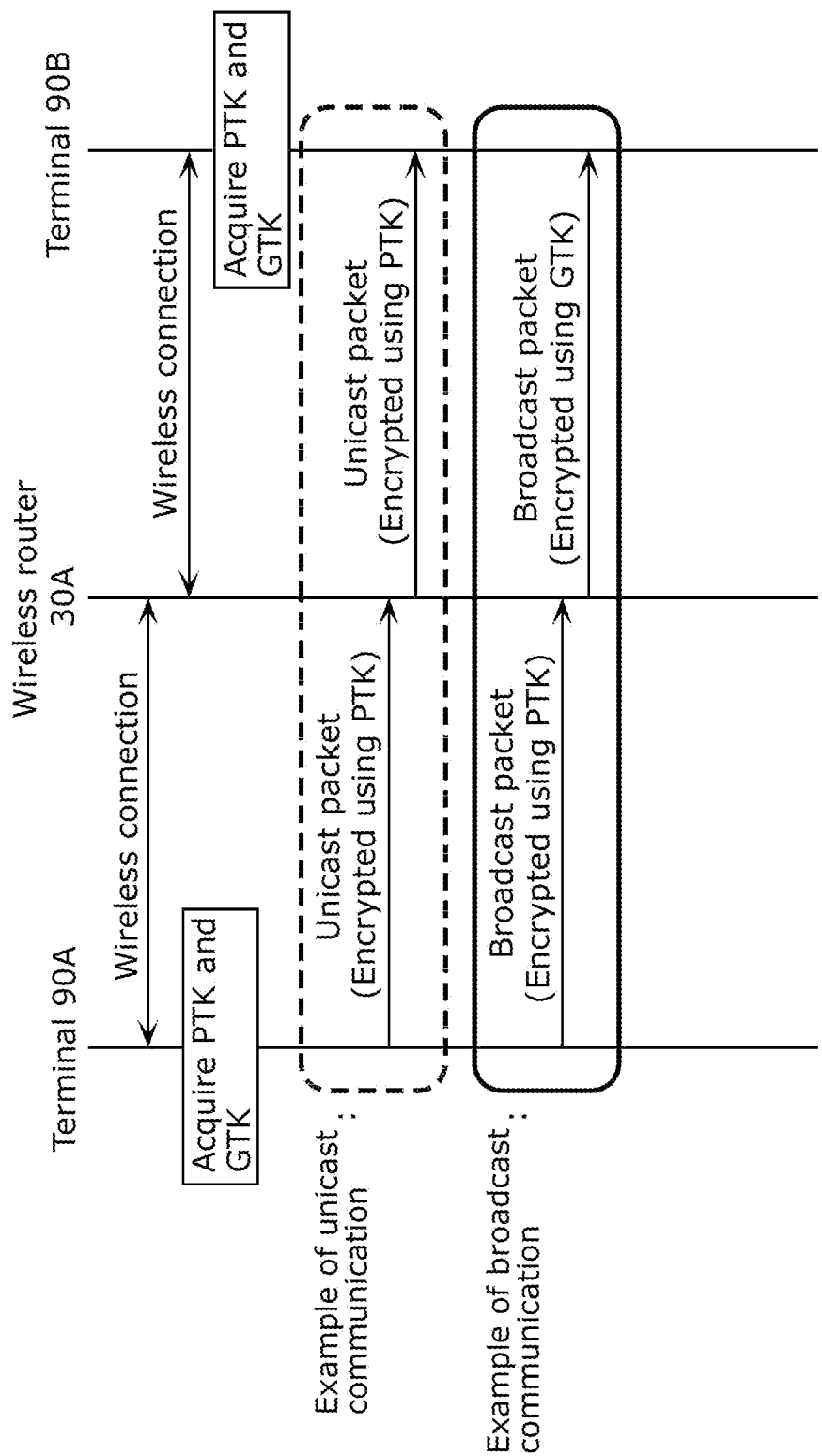
FIG. 2 is an illustrative diagram showing unicast communication and broadcast communication in the communication system according to Comparative Example 1.

FIG. 2 is an illustrative diagram showing unicast communication and broadcast communication in communication system 9 according to Comparative Example 1.

As shown in FIG. 2, terminal 90A establishes a wireless connection with wireless router 30A prior to starting communication with wireless router 30A. The wireless connection is established in accordance with the existing procedure such as, for example, Authentication, Association, or 4-way handshake. Terminal 90B also establishes a wireless connection with wireless router 30A in the same manner.

With the 4-way handshake, terminal 90A and wireless router 30A generate and store a PTK (Pairwise Transient Key) that is a key used for unicast communication performed between terminal 90A and wireless router 30A. Also, wireless router 30A generates a group key GTK that is a key used to encrypt broadcast packets transmitted to terminals 90A and the like, and provides the group key GTK to terminal 90A.

In this way, terminal 90A acquires a PTK and a GTK that are used to perform communication with wireless router 30A. Terminal 90B also acquires a PTK and a GTK in the same manner. The PTK varies from terminal to terminal, and the GTK is shared between terminals.

Next, keys that are used when terminal 90A transmits a packet to terminal 90B will be described.

In the case where terminal 90A transmits a unicast packet to terminal 90B, terminal 90A encrypts, by using a PTK, a unicast packet to be transmitted to terminal 90B, and then transmits the encrypted unicast packet to wireless router 30A. Wireless router 30A decrypts the unicast packet received from terminal 90A by using the PTK used to perform communication with terminal 90A. After that, wireless router 30A encrypts the unicast packet by using a PTK used to perform communication with terminal 90B, and then transmits the encrypted unicast packet to terminal 90B. Terminal 90B decrypts the unicast packet received from wireless router 30A by using the PTK.

In the case where terminal 90A transmits a broadcast packet to terminal 90B, terminal 90A encrypts, by using a PTK, a broadcast packet to be transmitted to terminal 90B, and then transmits the encrypted broadcast packet to wireless router 30A. Wireless router 30A decrypts the broadcast packet received from terminal 90A by using a PTK used to perform communication with terminal 90A. After that, wireless router 30A encrypts the broadcast packet by using a GTK, and then transmits the encrypted broadcast packet to all of the terminals connected to wireless router 30A. Terminal 90B receives the broadcast packet from wireless router 30A and decrypts the received broadcast packet by using the GTK.

As used herein, the term "broadcast" is a broad term that encompasses both concepts of broadcast in a strict sense (for example, communication whose destination IP address is 255.255.255.255) and multicast in a strict sense (for example, communication whose destination IP address is class D). Also, the term "broadcast" alone refers to broadcast in a broad sense.

Figure 3:
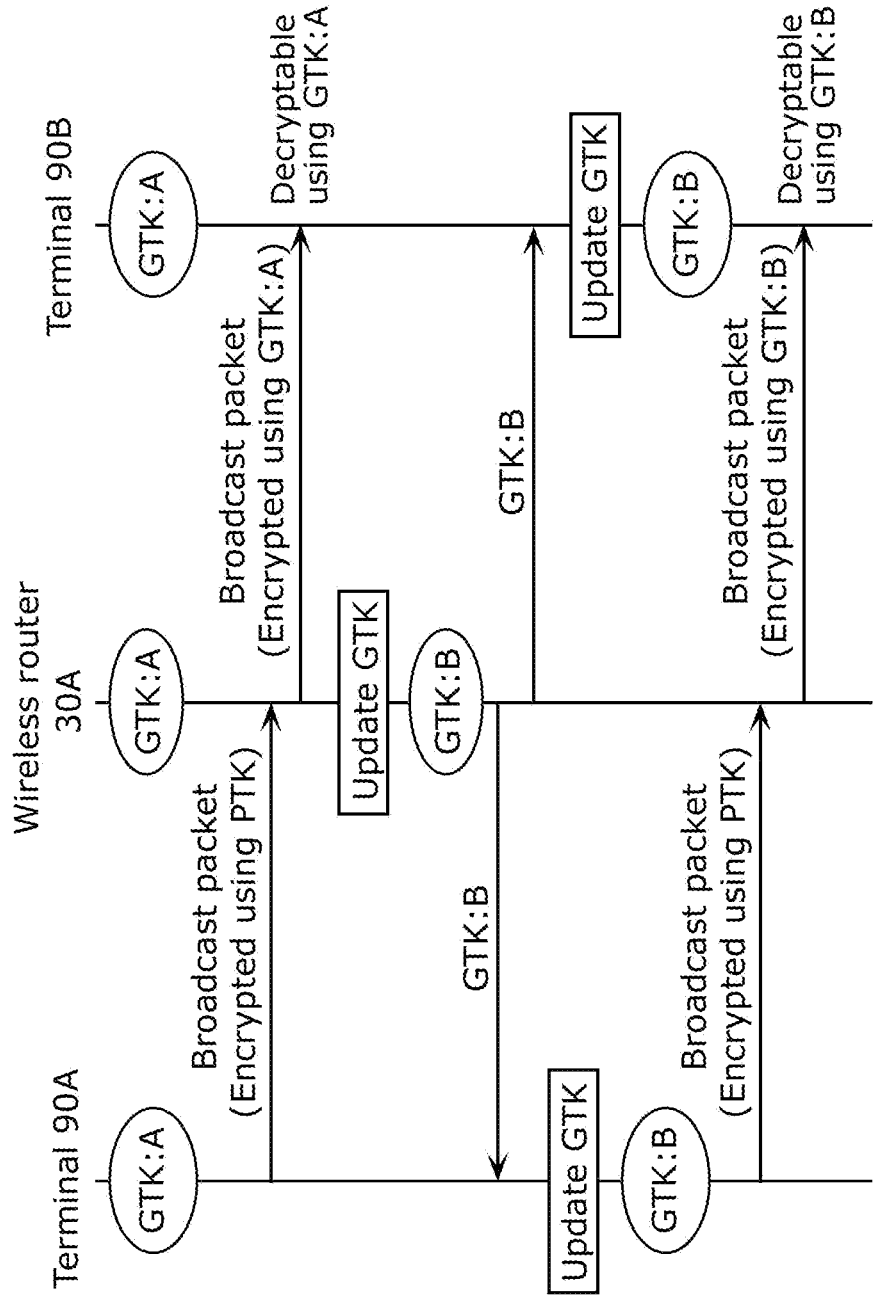
FIG. 3 is a sequence diagram of updating a GTK in the communication system according to Comparative Example 1.

FIG. 3 is a sequence diagram of updating a GTK in communication system 9 according to Comparative Example 1. The GTK is updated with the passage of time so as to improve security and the like.

It is assumed that, at the beginning, wireless router 30A and terminals 90A and 90B share a GTK (specifically, GTK:A). In this state, a broadcast packet transmitted from terminal 90A is encrypted by wireless router 30A by using GTK:A, and the encrypted broadcast packet is received by terminal 90B. Terminal 90B decrypts the received broadcast packet by using GTK:A.

Here, wireless router 30A updates the GTK. The updated GTK will be referred to as GTK:B.

When the GTK has been updated by wireless router 30A, wireless router 30A transmits GTK:B to each of terminals 90A and 90B. By doing so, GTK:B is shared between terminals 90A and 90B. In this state, a broadcast packet transmitted from terminal 90A is encrypted by wireless router 30A by using GTK:B, and the encrypted broadcast packet is received by terminal 90B. Terminal 90B decrypts the received broadcast packet by using GTK:B.

As described above, when the GTK is updated by wireless router 30A, it is necessary to transmit the updated GTK, namely, GTK:B, to the terminals. This is because, if the GTK is not updated, the terminals keep having GTK:A that is the GTK before update, and thus cannot decrypt a broadcast packet encrypted by using GTK:B that is the updated GTK.

However, a behavior in which wireless router 30A updates the GTK, but does not transmit GTK:B that is the updated GTK to terminal 90A is observed in the existing products. This will be specifically described below.

Figure 4:
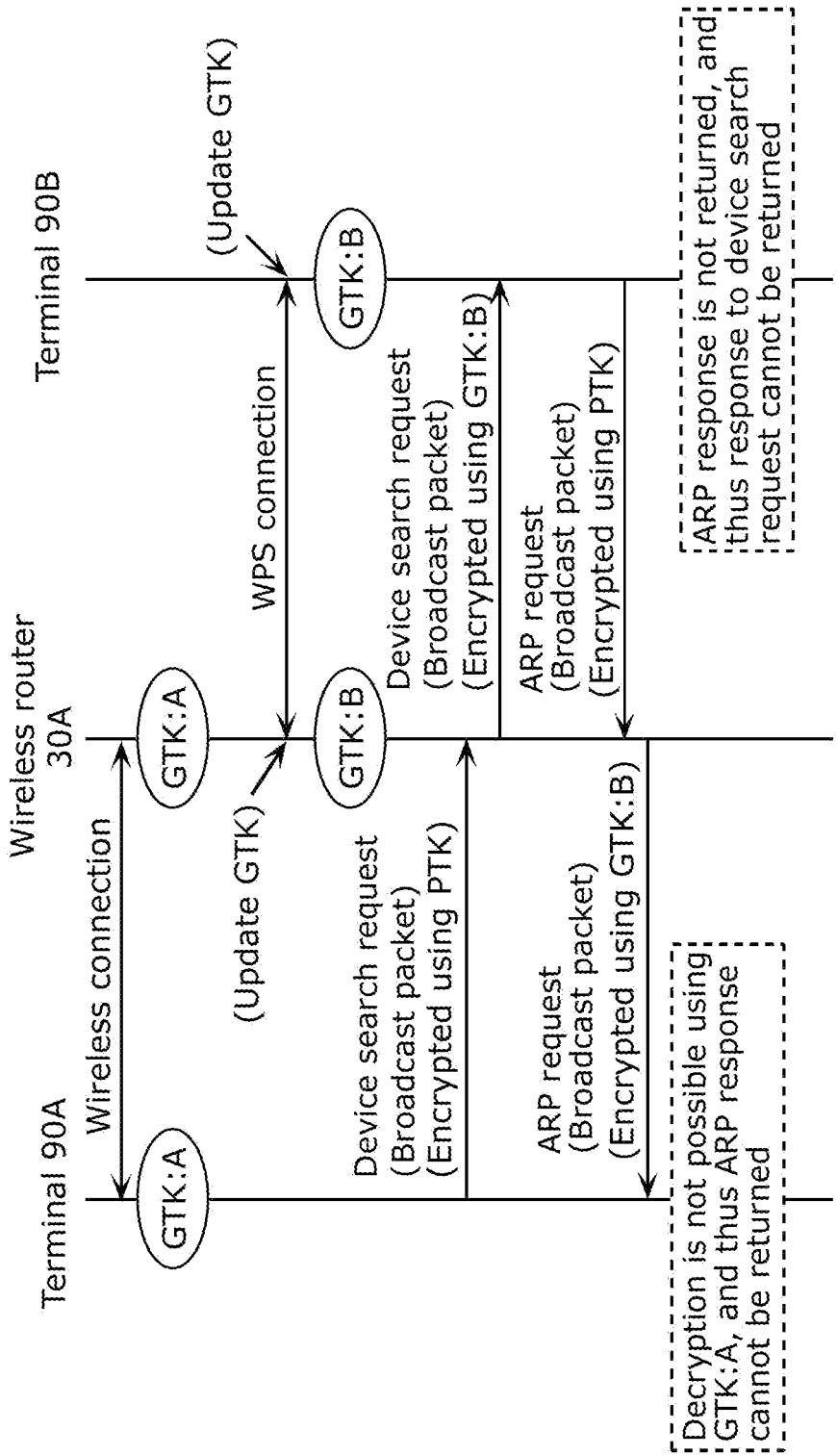
FIG. 4 is a first sequence diagram showing a behavior when the GTK is updated in the communication system according to Comparative Example 1.

FIG. 4 is a first sequence diagram showing a behavior when the GTK is updated in communication system 9 according to Comparative Example 1.

FIG. 4 shows a state in which after wireless router 30A has established a wireless connection with terminal 90A, wireless router 30A establishes a new wireless connection using WPS (Wi-Fi® Protected Setup) with terminal 90B. In this case, a behavior is observed in which wireless router 30A updates the GTK, but does not transmit GTK:B that is the updated GTK to terminal 90A.

For example, terminal 90A searches for a device with which communication can be performed by using a broadcast packet. At this time, terminal 90A transmits a device search request packet in a broadcast manner, and the device search request packet encrypted by using GTK:B is received by terminal 90B.

Terminal 90B that has received the device search request packet transmits a response packet in a unicast manner. Prior to transmitting a response packet in response to the device search request packet, in order to solve the MAC address of terminal 90A, terminal 90B transmits an ARP request packet in a broadcast manner. Then, the ARP request packet encrypted by wireless router 30A by using GTK:B is received by terminal 90A. However, terminal 90A does not have GTK:B, and thus cannot decrypt the ARP request packet.

As a result, terminal 90A cannot return an ARP response packet that is a response to the ARP request packet. Also, terminal 90B cannot return a response to the device search request packet because terminal 90A does not return an ARP response packet. Accordingly, it is not possible to perform communication between terminals 90A and 90B.

Figure 5:
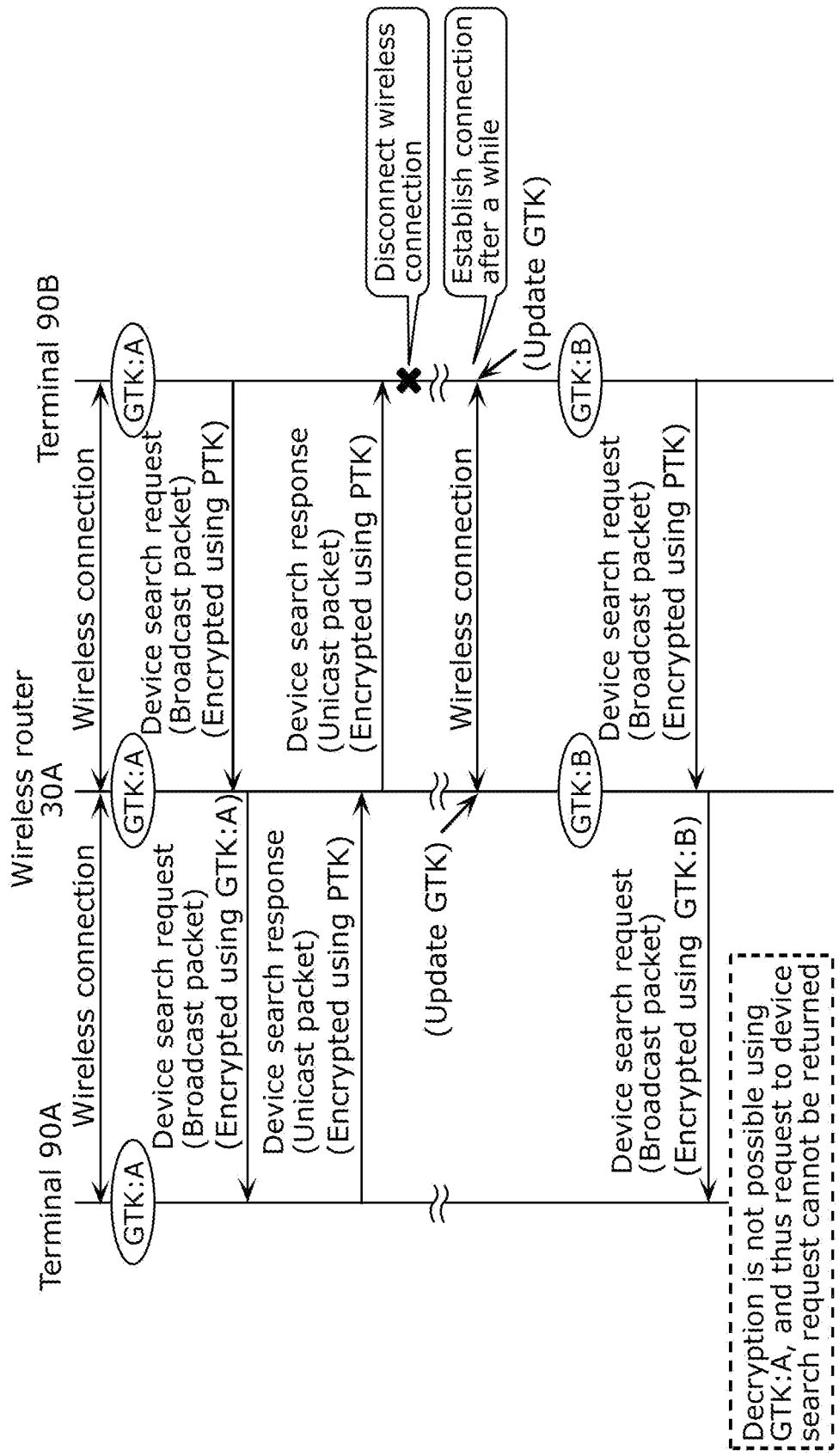
FIG. 5 is a second sequence diagram showing a behavior when the GTK is updated in the communication system according to Comparative Example 1.

FIG. 5 is a second sequence diagram showing a behavior when the GTK is updated in communication system 9 according to Comparative Example 1.

FIG. 5 shows a state in which after terminal 90B has recognized the presence of terminal 90A through transmission and reception of a device search request and a response between terminal 90B and terminal 90A via wireless router 30A, terminal 90B disconnects the wireless connection, and after a while, establishes a wireless connection. The above-described state corresponds to, for example, a state in which wireless router 30A is installed in a house, and a user leaves home while carrying terminal 90B that is a smartphone, and after a while, the user returns home. The length of time it takes from when terminal 90B disconnects the wireless connection to when a new wireless connection is established is, although it depends on the implementation specifications of wireless router 30A, for example, about 12 to 30 minutes or more, and more specifically 12 minutes or more. In this case, a behavior is observed in which wireless router 30A updates the GTK, but does not transmit GTK:B that is the updated GTK to terminal 90A.

For example, terminal 90B searches for a device with which communication can be performed by using a broadcast packet. At this time, terminal 90B transmits a device search request packet in a broadcast manner, and the device search request packet encrypted by using GTK: B is received by terminal 90A. However, terminal 90A does not have GTK:B, and thus cannot decrypt the device search request packet.

As a result, terminal 90A cannot return a response packet that is a response to the device search request. Accordingly, it is not possible to perform communication between terminals 90A and 90B.

Comparative Example 2

Figure 6:
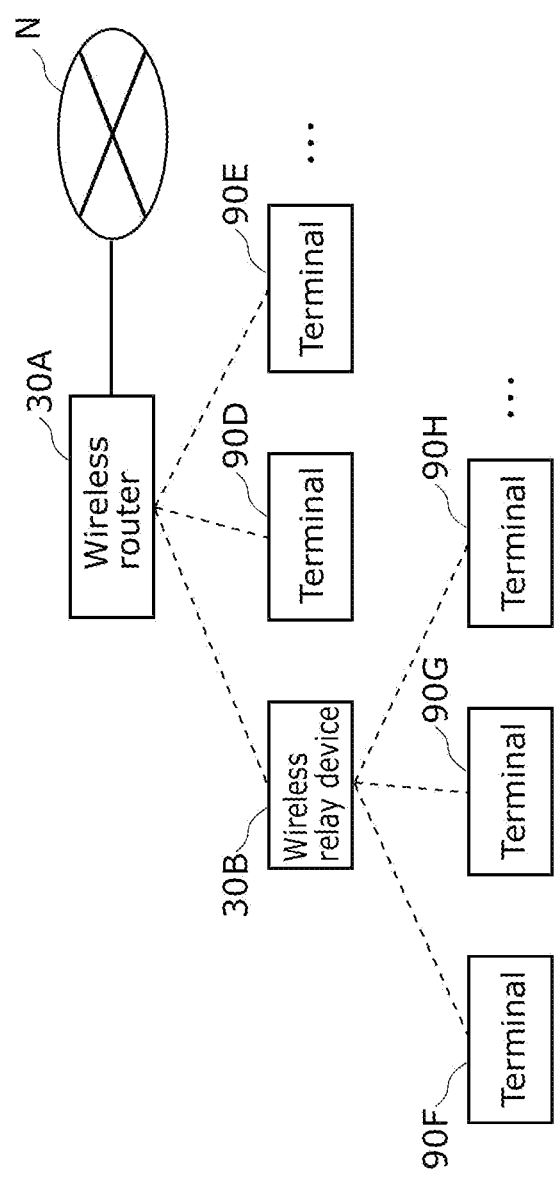
FIG. 6 is a block diagram showing a configuration of a communication system according to Comparative Example 2.

FIG. 6 is a block diagram showing a configuration of communication system 9A according to Comparative Example 2.

As shown in FIG. 6, communication system 9A includes wireless router 30A, wireless relay device 30B, and terminals 90D, 90E, 90F, 90G, and 90H (also referred to as terminals 90D to 90H).

As with wireless router 30A shown in FIG. 1, wireless router 30A is an access point (AP) or a base station for wireless communication. Wireless router 30A is connected to each of wireless relay device 30B and terminals 90D and 90E by using a wireless communication interface.

Wireless relay device 30B functions as an access point (AP) or a base station for wireless communication with respect to terminals 90F, 90G, and 90H (also referred to as terminals 90F and the like), and functions as a station (STA) or a terminal for wireless communication with respect to wireless router 30A. A wireless communication interface used in wireless relay device 30B to establish connections with terminals 90F and the like operates in an infrastructure mode as an AP, and a wireless communication interface used to establish a connection with wireless router 30A operates in an infrastructure mode as a STA.

Wireless relay device 30B establishes a wireless connection with each of terminals 90F and the like by using the wireless communication interface, and transmits and receives communication packets (also referred to simply as packets) to and from each of terminals 90F and the like through the established wireless connection. Also, when wireless relay device 30B has established a wireless connection with each of terminals 90F and the like, wireless relay device 30B acts as a proxy for each of terminals 90F and the like and establishes a wireless connection with wireless router 30A. By using the wireless connection, terminals 90F and the like can perform communication with terminals 90D and 90E via wireless router 30A and also perform communication with communication devices that are connected to network N.

As with terminals 90A and the like shown in FIG. 1, terminals 90D to 90H are stations (STA) or terminals for wireless communication.

Terminals 90D and 90E each establish a wireless connection with wireless router 30A by using a wireless communication interface, and transmit and receive packets to and from wireless router 30A through the established wireless connection.

Terminals 90F and the like each establish a wireless connection with wireless relay device 30B by using a wireless communication interface, and transmit and receive packets to and from wireless relay device 30B through the established wireless connection.

Figure 7:
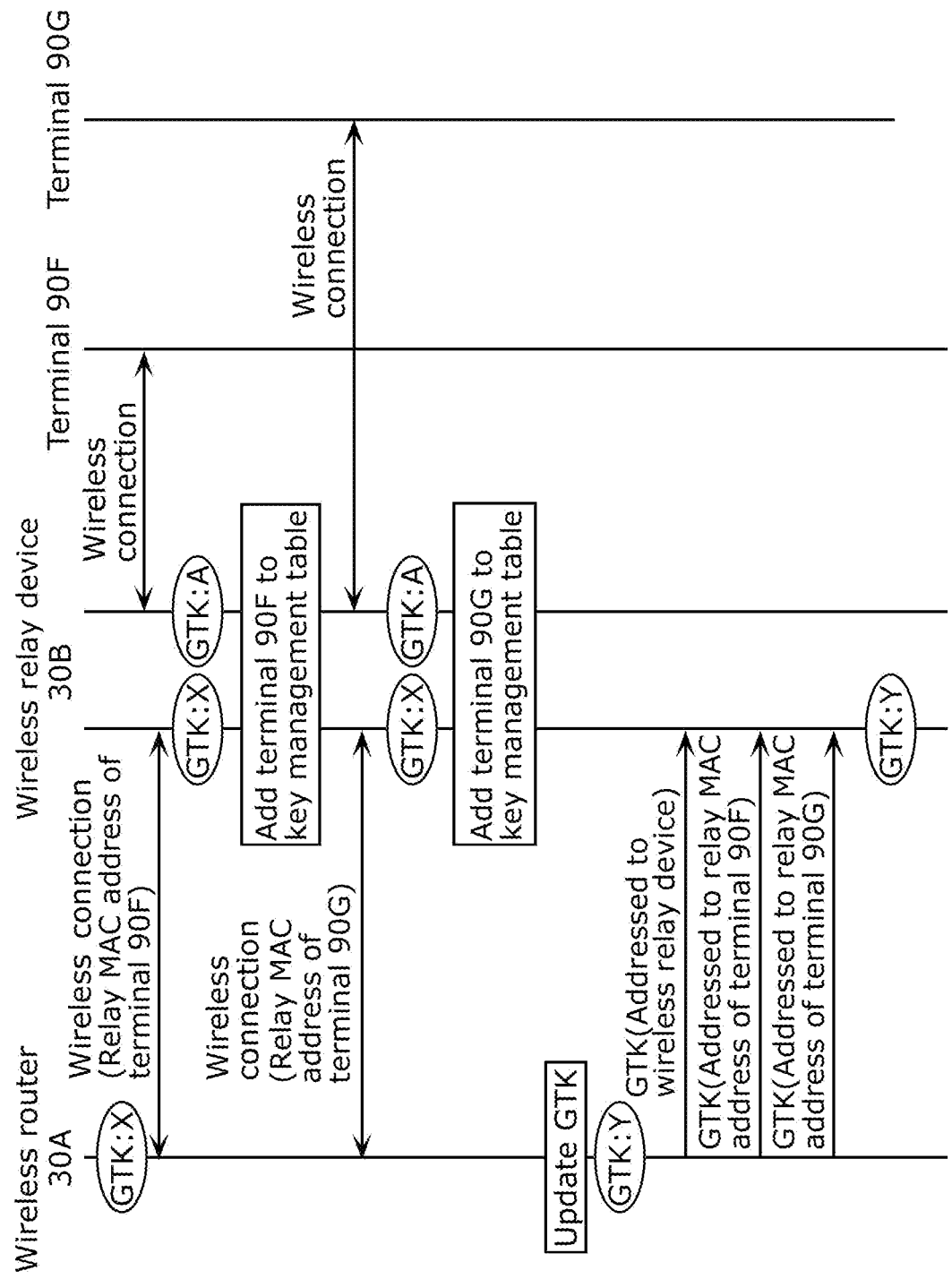
FIG. 7 is a sequence diagram showing the distribution of GTKs in the communication system according to Comparative Example 2.

FIG. 7 is a sequence diagram showing the distribution of GTKs in communication system 9A according to Comparative Example 2.

As shown in FIG. 7, when wireless relay device 30B has established a wireless connection with terminal 90F, wireless relay device 30B generates a MAC address (also referred to as relay MAC address) that acts as a proxy for terminal 90F, and establishes a wireless connection with wireless router 30A by using the generated relay MAC address. Wireless relay device 30B acquires GTK:X from wireless router 30A when the wireless connection is established. Also, wireless relay device 30B adds information regarding terminal 90F to a key management table stored in wireless relay device 30B.

Also, wireless relay device 30B establishes a wireless connection with terminal 90G after establishing a wireless connection with terminal 90F, and then, additionally generates a relay MAC address that acts as a proxy for terminal 90G, and additionally establishes a wireless connection with wireless router 30A by using the generated relay MAC address. Wireless relay device 30B acquires GTK:X from wireless router 30A when the wireless connection is established. Also, wireless relay device 30B adds information regarding terminal 90G to the key management table.

At this time, three terminals including wireless relay device 30B, terminal 90F, and terminal 90G are connected to wireless router 30A as the terminals.

Here, wireless router 30A updates the GTK to GTK:Y, and transmits GTK:Y to each of the three terminals including wireless relay device 30B, terminal 90F, and terminal 90G.

Figure 8:
FIG. 8 is an illustrative diagram showing an example of a key management table stored in a wireless relay device according to Comparative Example 2.

FIG. 8 is an illustrative diagram showing an example of the key management table stored in wireless relay device 30B according to Comparative Example 2. (a) in FIG. 8 shows the key management table before wireless router 30A updates the GTK in FIG. 7, and (b) in FIG. 8 shows the key management table after the GTK has been updated.

As shown in (a) in FIG. 8, the key management table includes SSID (Service Set Identifier) of router, encryption information on router side, relay MAC address of terminal, key information on router side, SSID of relay device, encryption information on terminal side, MAC address of terminal, and key information on terminal side.

The SSID of router is an SSID of wireless router 30A connected to wireless relay device 30B. In other words, the SSID of router is an SSID used for communication between wireless relay device 30B and wireless router 30A.

The encryption information on router side is information for identifying the encryption scheme used for communication between wireless relay device 30B and wireless router 30A.

The relay MAC address of terminal is a MAC address used when wireless relay device 30B acts as a proxy for the terminals and performs communication with wireless router 30A.

The key information on router side is a GTK used for communication between wireless relay device 30B and wireless router 30A.

The SSID of relay device is an SSID of wireless relay device 30B. In other words, the SSID of relay device is an SSID used for communication between wireless relay device 30B and terminals 90F and the like.

The encryption information on terminal side is information for identifying the encryption scheme used for communication between wireless relay device 30B and terminals 90F and the like.

The MAC address of terminal is a MAC address of terminal 90F and the like connected to wireless relay device 30B.

The key information on terminal side is a GTK used for communication between wireless relay device 30B and terminals 90F and the like.

For example, the first entry (#1) shown in (a) in FIG. 8 is an entry regarding terminal 90F. It indicates that, in terminal 90F, the GTK on the router side of wireless relay device 30B is GTK:X, and the GTK on terminal 90F side is GTK:A. Also, the second entry (#2) is an entry regarding terminal 90G. It indicates that, in terminal 90G as well, the GTK on the router side of wireless relay device 30B is GTK:X, and the GTK on terminal 90G side is GTK:A.

When wireless relay device 30B updates the GTK from GTK:X to GTK:Y, the key management table is updated as shown in (b) in FIG. 8. Specifically, in both of entry #1 and entry #2, the key information on router side is changed to GTK:Y.

Figure 9:
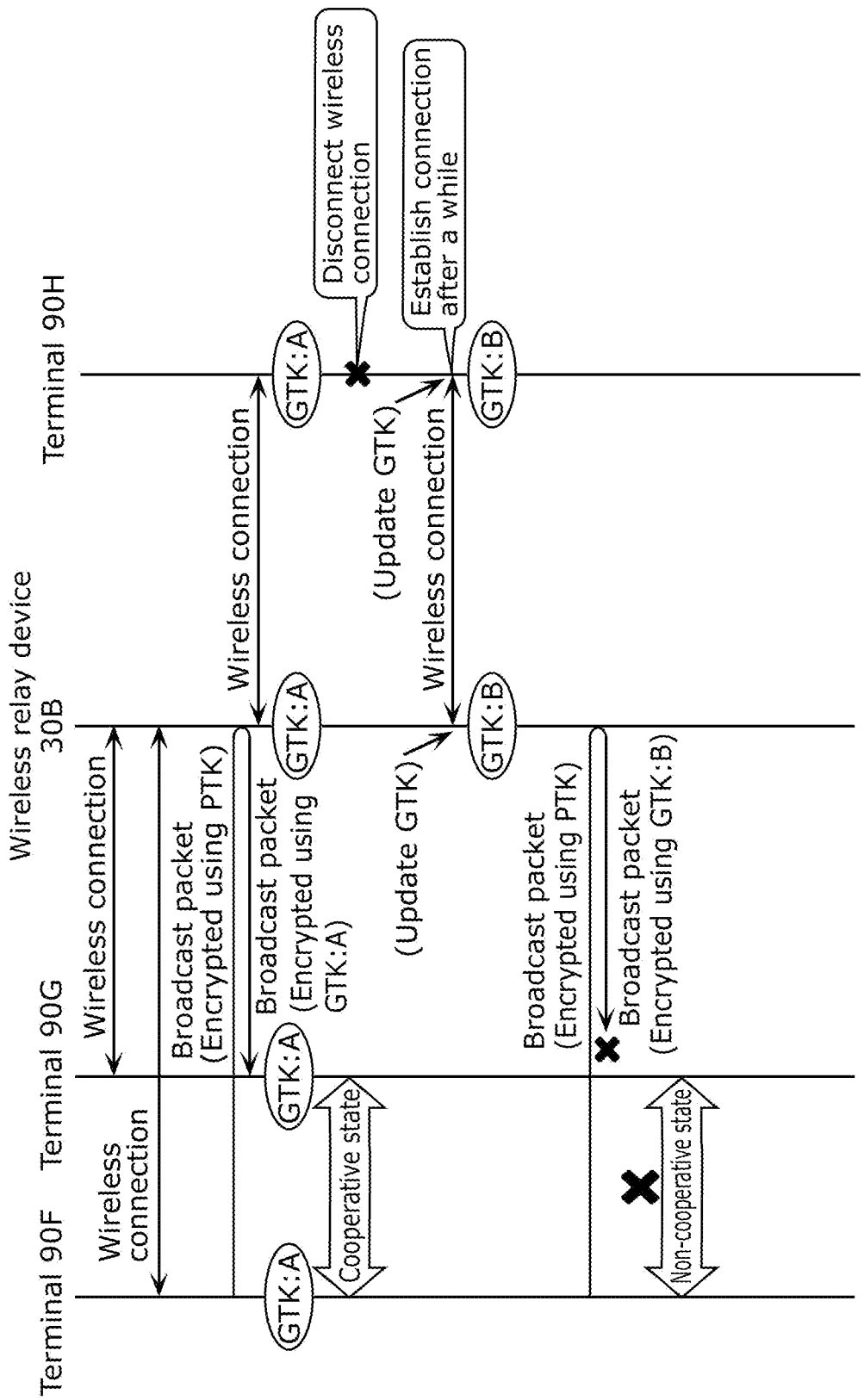
FIG. 9 is a sequence diagram showing a behavior when the GTK is updated in the communication system according to Comparative Example 2.

FIG. 9 is a sequence diagram showing a behavior when the GTK is updated in communication system 9A according to Comparative Example 2.

The diagram shows a state in which after wireless relay device 30B has established a wireless connection with each of terminals 90F, 90G, and 90H, terminal 90H disconnects the wireless connection, and after a while, establishes a wireless connection. In this case, a behavior is observed in which wireless relay device 30B updates the GTK, but does not transmit GTK:B that is the updated GTK to terminals 90F and 90G.

The length of time it takes from when terminal 90H disconnects the wireless connection to when a new wireless connection is established is, although it depends of the implementation specifications of wireless relay device 30B, for example, about 12 to 30 minutes or more, and more specifically 12 minutes or more.

For example, terminal 90F searches for a device with which communication can be performed by using a broadcast packet. Before the GTK is updated, terminals 90F and 90G and wireless relay device 30B have GTK:A, and thus terminals 90F and 90G can perform communication by using broadcast, and can carry out, for example, information processing in cooperation with each other.

However, after the GTK is updated by wireless relay device 30B, a broadcast packet transmitted from terminal 90F is encrypted by wireless relay device 30B by using GTK:B, and then received by terminal 90G. Terminal 90G does not have GTK:B, and thus cannot decrypt the broadcast packet. This phenomenon also occurs when terminal 90G transmits a broadcast packet.

As described above, communication that uses broadcast packets cannot be performed between terminals 90F and 90G, and thus terminals 90F and 90G cannot perform information processing in cooperation with each other.

As described above, when a behavior occurs in which wireless router 30A or wireless relay device 30B updates the GTK, but does not transmit GTK:B that is the updated GTK to the terminals, a problem arises in that communication that uses broadcast packets cannot be performed between the terminals.

In order to solve the problem described above, a terminal according to an aspect of the present invention includes: a communicator that wirelessly performs encrypted communication with an access point; a processor; and a memory that stores at least one program executed by the processor and a key management table for storing a group key for the encrypted communication, herein the processor performs: acquiring the group key for the encrypted communication from the access point and storing the group key acquired in the key management table as a first group key; receiving a broadcast packet encrypted by the access point via the communicator; making a first determination as to whether the broadcast packet received is decryptable by using the first group key; and when it is determined, in the first determination, that the broadcast packet is not decryptable by using the first group key, generating information indicating that the first group key needs to be updated.

According to the aspect described above, when it is not possible to decrypt the broadcast packet received from the access point by using the first group key, the terminal can carry out the processing for updating the group key based on the generated information. The situation where it is not possible to decrypt the broadcast packet by using the first group key occurs when the access point performs a behavior that updates the group key, but does not transmit the updated group key to the terminal. When the access point performs the above-described behavior, the terminal carries out the processing for updating the group key, as a result of which, the terminal can acquire the updated group key, and thus a state can be achieved in which the broadcast packet transmitted by the access point can be decrypted. As described above, with the terminal, when it is not possible to decrypt the broadcast packet received from the access point, a state can be achieved in which the broadcast packet can be decrypted.

For example, the processor may further perform, based on the information generated: after a wireless connection with the access point is disconnected, establishment processing of establishing a new wireless connection with the access point via the communicator within a predetermined period; and storing a group key for encrypted communication used in the new wireless connection acquired through the establishment processing in the key management table as a second group key so as to update the first group key to the second group key.

According to the aspect described above, if it is determined that the group key needs to be updated, the terminal disconnects the wireless connection and then establishes a new wireless connection so as to update the group key. Accordingly, the group key can be updated by using the existing wireless communication processing without having to perform processing dedicated to update the group key. Thus, with the terminal, when it is not possible to decrypt the broadcast packet received from the access point, by performing processing that uses the existing wireless communication processing, a state can be achieved in which the broadcast packet can be decrypted.

For example, the processor may perform: repeatedly receiving the broadcast packet encrypted by the access point; and making the first determination for each of the broadcast packet repeatedly received.

According to the aspect described above, the terminal monitors whether the state in which the broadcast packet received from the access point can be decrypted is maintained, and if it is determined that the state in which the broadcast packet received from the access point can be decrypted is not maintained, the terminal can promptly detect that fact and perform the processing for updating the group key. Accordingly, when it is not possible to decrypt the broadcast packet received from the access point, the terminal can promptly detect that fact, and thus a state can be achieved in which the broadcast packet can be decrypted.

For example, the processor may perform: in the first determination, decryption processing for decrypting the broadcast packet received by using the first group key; making a second determination as to whether a decrypted packet obtained through the decryption processing is a broadcast packet of a first type that is pre-set; and when it is determined, in the second determination, that the decrypted packet is the broadcast packet of the first type, determining that the broadcast packet is decryptable by using the first group key.

According to the aspect described above, the terminal has stored the broadcast packet of a pre-set type that needs to be received, and determines whether the received broadcast packet can be decrypted based on whether the packet obtained through decryption is the packet of a pre-set type. Accordingly, with the terminal, it is possible to more easily achieve a state in which the broadcast packet received from the access point can be decrypted.

For example, the processor may perform: prior to receiving the broadcast packet, transmitting a Dynamic Host Configuration Protocol (DHCP) T2 request packet whose broadcast flag is True to a DHCP server via the communicator, the broadcast packet received being a DHCP ACK packet received from the DHCP server as a response to the DHCP T2 request packet transmitted; and in the second determination, determining whether the decrypted packet obtained through the decryption processing is a DHCP ACK packet as a broadcast packet of a pre-set type.

According to the aspect described above, the terminal causes the access point to transmit a broadcast packet by using a DHCP protocol message. Specifically, the access point is caused to transmit a broadcast packet by utilizing a conventional mechanism of DHCP protocol in which when a DHCP server receives a DHCP T2 request packet whose broadcast flag is True, the DHCP server transmits a DHCP ACK packet in a broadcast manner. Accordingly, with the terminal, it is possible to more easily achieve a state in which the broadcast packet received from the access point can be decrypted by utilizing the existing DHCP protocol.

For example, the processor may perform: repeatedly receiving the DHCP ACK packet by repeatedly transmitting the DHCP T2 request packet.

According to the aspect described above, the terminal can repeatedly transmit the DHCP ACK packet to the access point, as a result of which, the terminal can repeatedly receive the DHCP ACK packet that is a broadcast packet from the access point. With this configuration, the terminal monitors whether the state in which the broadcast packet received from the access point can be decrypted is maintained, and if it is determined that the state in which the broadcast packet received from the access point can be decrypted is not maintained, a state can be achieved in which the broadcast packet can be decrypted. Accordingly, it is possible to more promptly achieve a state in which the broadcast packet received from the access point can be decrypted by utilizing the existing DHCP protocol.

For example, the processor may perform: in the second determination, determining whether the decrypted packet obtained through the decryption processing is a broadcast packet of a pre-set type transmitted by another terminal that is in wireless communication with the access point and transferred by the access point.

According to the aspect described above, the terminal causes the access point to transmit a broadcast packet by utilizing the transmission of a broadcast packet by another terminal that is connected to the access point. Accordingly, with the terminal, it is possible to more easily achieve a state in which the broadcast packet received from the access point can be decrypted by utilizing another terminal.

For example, the processor may further perform: when the broadcast packet is not received within a predetermined period during which the broadcast packet needs to be received, generating the information indicating that the first group key needs to be updated.

According to the aspect described above, the terminal carries out the processing for updating the group key even when the terminal does not receive a broadcast packet that needs to be received during the predetermined period. Depending on the implementation specifications of the communicator, when a received broadcast packet cannot be successfully decrypted by using the group key stored in the terminal, it may be determined that the broadcast packet is not received. In this case, the processor can know, based on the fact that no broadcast packet has been received during the predetermined period during which the broadcast packet needs to be received, that decryption of a broadcast packet cannot be performed. Accordingly, with the terminal, irrespective of the implementation specifications of the communicator, a state can be achieved in which the broadcast packet received from the access point can be decrypted.

For example, the processor may perform: when the broadcast packet is not received within the predetermined period, further attempting communication between a transmission source device that transmitted the broadcast packet and the communicator so as to determine whether the transmission source device is capable of communication; and generating the information indicating that the first group key needs to be updated, only when it is determined that the transmission source device is capable of communication.

According to the aspect described above, in the case where the terminal knows, based on the fact that no broadcast packet has been received during the predetermined period during which the broadcast packet needs to be received, that decryption of a broadcast packet cannot be performed, the broadcast packet transmission source device may stop operating. In this case, the terminal should not update the group key. Accordingly, by configuring the terminal to attempt communication with the transmission source device, and proceed to the processing for updating the group key only when it is determined that the transmission source device is capable of communication, or in other words, the transmission source device does not stop operating, as a result of which, the group key can be updated more appropriately. Thus, a state can be achieved in which the broadcast packet received from the access point can be decrypted, while avoiding a situation where the group key is updated when it is unnecessary to update the group key.

Also, a communication method according to an aspect of the invention is a communication method executed by a terminal, the terminal including: a communicator that wirelessly performs encrypted communication with an access point; a processor; and a memory that stores at least one program executed by the processor and a key management table for storing a group key for the encrypted communication, the communication method, including: by the processor, acquiring the group key for the encrypted communication from the access point and storing the group key acquired in the key management table as a first group key; receiving a broadcast packet encrypted by the access point via the communicator; making a first determination as to whether the broadcast packet received is decryptable by using the first group key; and when it is determined, in the first determination, that the broadcast packet is not decryptable by using the first group key, generating information indicating that the first group key needs to be updated.

With this configuration, the same advantageous effects as those of the above-described terminal can be obtained.

Also, a recording medium according to an aspect of the present invention is a non-transitory computer-readable recording medium in which a program for causing a computer to execute the above-described communication method is recorded.

With this configuration, the same advantageous effects as those of the above-described terminal can be obtained.

Generic or specific aspects of the present invention may be implemented by a system, a method, an integrated circuit, a computer program or a computer-readable recording medium such as a CD-ROM, or may be implemented by any combination of systems, methods, integrated circuits, computer programs, and recording media.

Hereinafter, an embodiment will be described specifically with reference to the drawings.

The embodiment described below shows a generic or specific example of the present invention. The numerical values, shapes, materials, structural elements, the arrangement and connection of the structural elements, steps, the order of the steps, and the like shown in the following embodiment are merely examples, and therefore are not intended to limit the scope of the present invention. Also, among the structural elements described in the following embodiment, structural elements not recited in any one of the independent claims are described as arbitrary structural elements.

Embodiment

In the present embodiment, a terminal and the like, with which when it is not possible to decrypt a broadcast packet received from an access point, a state can be achieved in which the broad packet can be decrypted.

Figure 10:
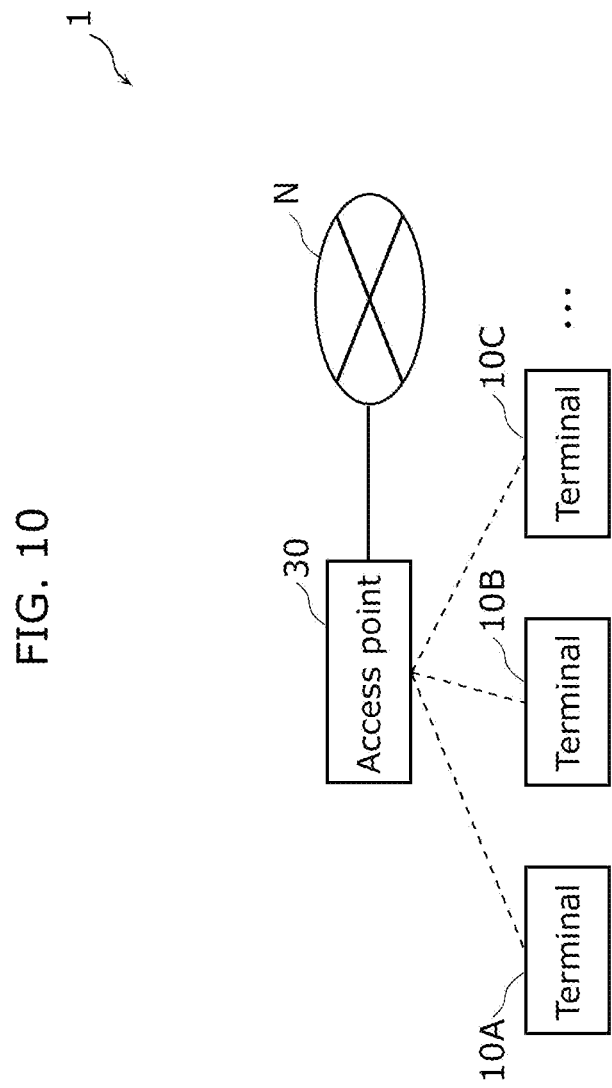
FIG. 10 is a block diagram showing a configuration of a communication system according to one exemplary embodiment.

FIG. 10 is a block diagram showing a configuration of communication system 1 according to the present embodiment.

As shown in FIG. 10, communication system 1 according to the present embodiment includes access point 30, and terminals 10A, 10B, and 10C.

Access point 30 is an access point (AP) or a base station for wireless communication. Access point 30 is, specifically, a widely used wireless router, wireless relay device, or the like.

Access point 30 establishes a wireless connection with each of terminals 10A and the like by using a wireless communication interface, and transmits and receives packets to and from each of terminals 10A and the like through the established wireless connection. Access point 30 transfers, to network N, packets that are addressed to communication devices connected to network N and that were transmitted by terminals 10A and the like, and transfers, to terminals 10A and the like, packets that are addressed to terminals 10A and the like and that were received from network N. Also, access point 30 relays transmission and reception of packets between terminals 10A and the like. Access point 30 is a concept that encompasses wireless router 30A and wireless relay device 30B.

Hereinafter, the configurations of terminals 10A and the like and access point 30 will be described one by one in sequence.

Terminal 10A is a station (STA) or a terminal for wireless communication.

Terminal 10A establishes a wireless connection with access point 30 by using a wireless communication interface, and transmits and receives packets to and from access point 30 through the established wireless connection. Terminal 10A may be any device as long as it is possible to perform communication, and may be a computer, a smartphone, a device (an electric household appliance, industrial equipment, or office equipment) that has a communication function, or the like.

Terminals 10B and 10C each have the same function as that of terminal 10A, and operate independently of terminal 10A.

Figure 11:
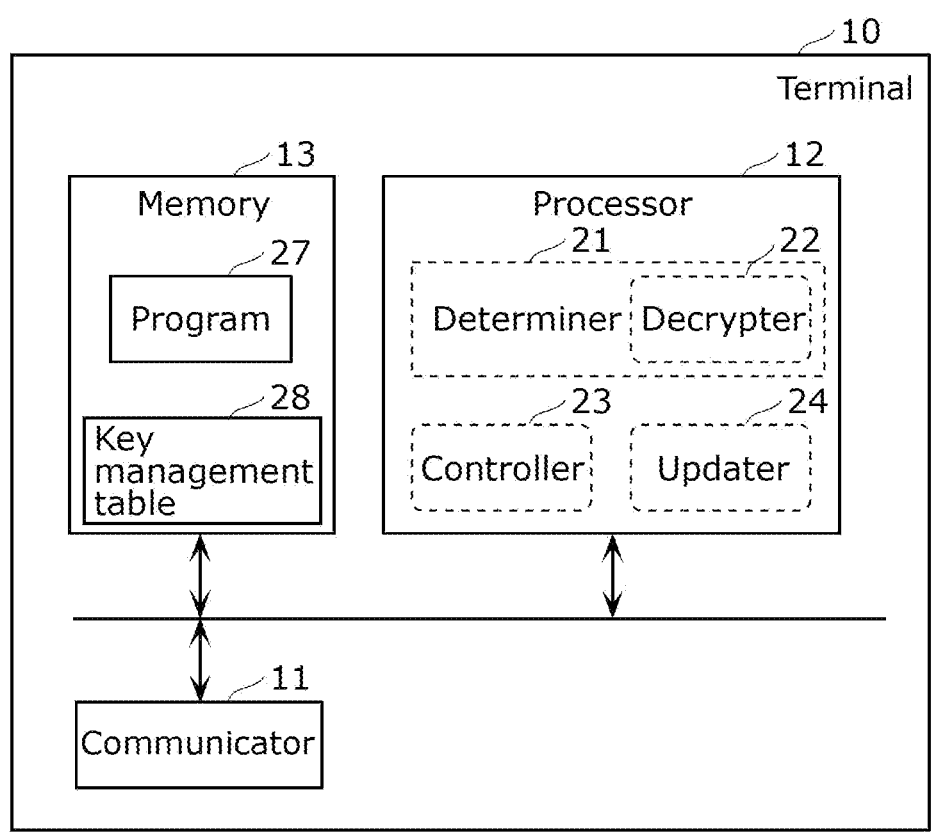
FIG. 11 is a block diagram showing a configuration of a terminal according to the embodiment.

FIG. 11 is a block diagram showing a configuration of terminal 10 according to the present embodiment. FIG. 12 is an illustrative diagram showing a key management table stored in terminal 10 according to the present embodiment.

As shown in FIG. 11, terminal 10 includes communicator 11, processor 12, and memory 13. Terminal 10 corresponds to each of terminals 10A, 10B, and 10C shown in FIG. 10.

Communicator 11 is a wireless communication interface device. Communicator 11 wirelessly performs encrypted communication with access point 30. The communication standard of wireless communication performed by communicator 11 may be, for example, wireless LAN of IEEE 802.11 series (IEEE 802.11a, b, g, n, or the like), but the communication standard is not limited thereto. Communicator 11 operates in an infrastructure mode as a STA. Communicator 11 receives, from access point 30, a broadcast packet that has been encrypted by access point 30 by using a GTK.

Memory 13 is a storage device that is used as a work area when processor 12 executes program 27. Also, in memory 13, program 27 is stored, and also, for example, key management table 28 is stored as information required to execute program 27. Key management table 28 is a table for storing a group key for encrypted communication performed by terminal 10 (see FIG. 12).

As shown in FIG. 12, key management table 28 manages SSID of access point, encryption information, MAC address of access point, and key information in association with each other.

The SSID of access point is an SSID of access point 30 with which terminal 10 has established a wireless connection. In FIG. 12, SSID2 is shown as an example.

The encryption information is information for identifying the encryption scheme used for communication between terminal 10 and access point 30. In FIG. 12, WPA2-PSK-AES is shown as an example.

The MAC address of access point is an MAC address of access point 30 with which terminal 10 has established a wireless connection. In FIG. 12, 33:45:20:65:A9:AA is shown as an example.

The key information is a group key used for communication between terminal 10 and access point 30. In FIG. 12, GTK:A is shown as an example.

Processor 12 is a processing device that implements the functions of determiner 21, controller 23, and updater 24 by executing program 27 by using memory 13. Also, processor 12 performs control on a widely used application that is executed by terminal 10. Hereinafter, the above-described functions implemented by processor 12 will be described.

Determiner 21 receives a broadcast packet encrypted by access point 30 via communicator 11, and determines whether the received broadcast packet can be decrypted by using the first group key. The determination made by determiner 21 will also be referred to as "first determination". In the case where the broadcast packet is repeatedly received, determiner 21 makes the first determination for each of the received broadcast packets.

More specifically, determiner 21 includes decrypter 22, and the type of broadcast packet is pre-set before the broadcast packet is received. The pre-set type will also be referred to as "first type". Determiner 21 causes decrypter 22 to perform decryption processing for decrypting the received broadcast packet by using the first group key. Then, determiner 21 determines whether a decrypted packet obtained through the decryption processing is a broadcast packet of the first type. The determination made by determiner 21 here will also be referred to as "second determination". Then, when it is determined, in the second determination, that the decrypted packet is a broadcast packet of the first type, determiner 21 determines that the broadcast packet can be decrypted by using the first group key.

Controller 23 generates information indicating that the first group key needs to be updated if determiner 21 determines in the first determination that the broadcast packet cannot be decrypted by using the first group key. For example, controller 23 generates information that causes updater 24 to update the group key.

Specifically, controller 23 generates control information that causes updater 24 to carry out the processing of disconnecting the wireless connection with the access point and re-connecting a wireless connection with the access point and the processing of storing a new group key.

Updater 24 acquires, from access point 30, a group key for encrypted communication, and stores the acquired group key in key management table 28 as a first group key. Also, updater 24 performs, based on the information generated by controller 23, the processing of updating the group key stored in key management table 28. Updater 24 performs, as the processing for updating the group key, processing of disconnecting the wireless connection with access point 30 and establishment processing of establishing a new wireless connection with access point 30 via communicator 11 within a predetermined period after disconnecting the wireless connection with access point 30. Then, updater 24 stores, in key management table 28, a group key for encrypted communication used in the new wireless connection acquired through the establishment processing as a second group key so as to update the first group key to the second group key.

Here, the predetermined period is set to, although it depends on the implementation specifications of access point 30, for example, about 12 to 30 minutes or less, and more specifically 12 minutes or less. With this configuration, a behavior in which the GTK is updated when access point 30 establishes a new wireless connection, but the updated GTK is not transmitted to the terminal, or in other words, the behavior observed in Comparative Examples 1 and 2 can be avoided.

In the wireless LAN standard of IEEE 802.11 series, no dedicated procedure or processing for acquiring a group key is specified. For this reason, terminal 10 acquires a group key by using the processing of disconnecting the wireless connection and the establishment processing of establishing a new wireless connection as described above. By doing so, it is possible to obtain an advantage in that terminal 10 can acquire a group key without adding a modification to the wireless LAN standard of IEEE 802.11 series.

As the processing for updating the group key, a message that prompts the user to perform an operation of disconnecting the wireless connection and connecting a wireless connection may be displayed on a screen, or may be output by using a sound. By doing so, it is possible to obtain an advantage in that a situation where terminal 10 disconnects the wireless connection against the user's intention can be avoided.

Here, an example of the broadcast packet of the first type is a DHCP ACK packet. In this case, controller 23 transmits, before receiving a broadcast packet, a packet that is a DHCP T2 request packet and whose broadcast flag is set to True (also referred to simply as DHCP T2 request packet) to access point 30 that functions as a DHCP server via communicator 11. Then, determiner 21 receives a DHCP ACK packet that is a broadcast packet from access point 30 as a response to the DHCP T2 request packet transmitted. Determiner 21 determines, in the second determination, whether a decrypted packet obtained through the decryption processing is a DHCP ACK packet that is the broadcast packet of a pre-set type. In this case, controller 23 may repeatedly transmit the DHCP T2 request packet so as to repeatedly receive the DHCP ACK packet. In this case, determiner 21 makes the second determination for each of the received DHCP ACK packets. The transmission of the packet is repeated, for example, about every 1 to 5 minutes. By doing so, determiner 21 constantly monitors whether the group key used by access point 30 to perform encryption has been updated. If it is determined that the group key has been updated, determiner 21 can know that the group key has been updated 1 to 5 minutes thereafter.

The destination of the DHCP T2 request packet is a DHCP server. In the case where access point 30 includes DHCP server 34, the destination of the DHCP T2 request packet is access point 30.

Even in the case where access point 30 does not have the DHCP server function, and there is a DHCP server device other than access point 30, access point 30 transfers the DHCP ACK packet to terminal 10, and thus the above-described explanation still stands.

Also, another example of the broadcast packet of a pre-set type is a broadcast packet of a pre-set type transmitted by another terminal that performs wireless communication with access point 30 and transferred by access point 30. In this case, determiner 21 determines whether a decrypted packet obtained through the decryption processing is the broadcast packet of a pre-set type transmitted by another terminal.

Controller 23 may further generate information indicating that the first group key needs to be updated if no broadcast packet is received during a predetermined period during which the broadcast packet needs to be received. The predetermined period may be set to, for example, in the case where the DHCP packet is used as described above, within about several seconds to several minutes after the DHCP T2 request was transmitted.

In this case, determiner 21 may further determine, by attempting communication between the transmission source device that transmitted the broadcast packet and communicator 11, whether the transmission source device is capable of communication. Then, only when it is determined that the transmission source device is capable of communication, determiner 21 may generate information indicating that the first group key needs to be updated.

If the determination that the first group key needs to be updated is made based only on the condition where no broadcast packet is received during the predetermined period, the information indicating that the first group key needs to be updated may be generated not only when access point 30 has updated the GTK but also when the transmission source device stops operating. To address this, determiner 21 may generate the information only when it is determined, as a result of attempting communication between communicator 11 and the transmission source device, that the transmission source device is capable of communication, or in other words, the transmission source device does not stop operating. By doing so, it is possible to avoid a situation where the information indicating that the first group key needs to be updated is generated despite the fact that the GTK has not been updated.

Communication between communicator 11 and the transmission source device may be attempted by using, for example, a method that uses a ping command, or in other words, transmission of a ping request (Echo request) and reception of a ping response (Echo reply) (or in other words, exchange of ICMP packets).

The destination of the ping request is the transmission source device. In the case where a DHCP ACK packet is used as the broadcast packet of the first type, the destination of the ping request is a DHCP server. In the case where access point 30 includes DHCP server 34, the destination of the ping request packet is access point 30.

The attempt of communication between communicator 11 and the transmission source device may be performed not only when no broadcast packet is received during the predetermined period, but also performed constantly.

Figure 13:
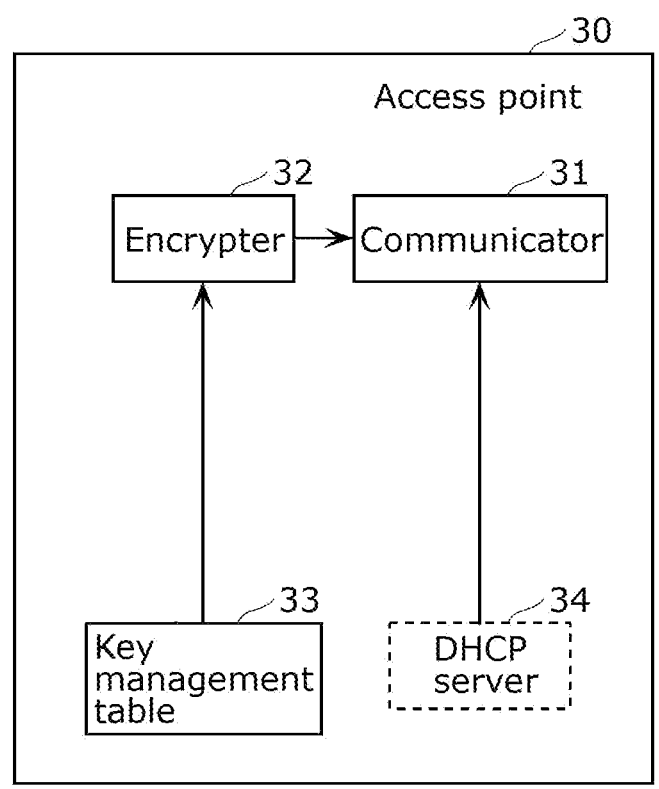
FIG. 13 is a block diagram showing a configuration of an access point according to the embodiment.

FIG. 13 is a block diagram showing a configuration of access point 30 according to the present embodiment.

As shown in FIG. 13, access point 30 includes communicator 31, encrypter 32, and key management table 33. Access point 30 may further include DHCP server 34.

Communicator 31 is a wireless communication interface device. Communicator 31 wirelessly performs encrypted communication with terminal 10. The communication standard of wireless communication performed by communicator 31 may be, for example, wireless LAN of IEEE 802.11 series, but the communication standard is not limited thereto. Communicator 31 operates in an infrastructure mode as an AP. Communicator 31 receives a broadcast packet encrypted by encrypter 32.

Encrypter 32 encrypts a broadcast packet that needs to be transmitted from access point 30 to terminal 10. When encrypter 32 acquires a broadcast packet that needs to be transmitted from access point 30 to terminal 10, encrypter 32 acquires the group key stored in key management table 33, and encrypts the broadcast packet by using the acquired group key.

Key management table 33 is a table in which the group key used to encrypt broadcast packets is stored. The group key is updated at a predetermined timing based on the processing performed by access point 30. When the group key has been updated, a notification may be sent from access point 30 to the terminal that is wirelessly connected to access point 30. However, depending on the implementation of access point 30, the notification may not be sent to the terminal even when the group key has been updated.

DHCP server 34 functions as a DHCP protocol server for assigning an IP address to terminal 10 that is wirelessly connected to access point 30. DHCP server 34 transmits a DHCP ACK packet that is a broadcast packet during a set of processing operations of assigning an IP address to terminal 10. The DHCP ACK packet is transmitted, for example, when a DHCP T2 request packet has been received.

A description of the operations performed by terminal 10 and the communication system configured as described above will be given below. Hereinafter, a first operation according to the present embodiment that is minimum required to solve the problem, a second operation that more specifically shows the first operation, and a third operation performed in the case where both a wireless router and a wireless relay device are used will be described one by one in sequence.

(1) First Operation

Figure 14:
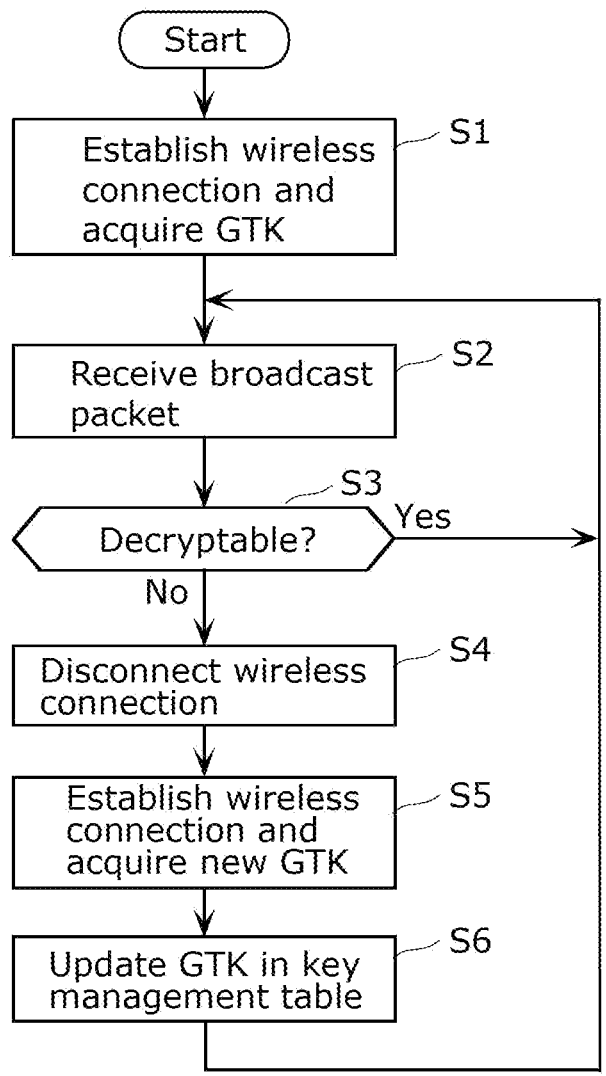
FIG. 14 is a flow diagram showing a first operation performed by the terminal according to the embodiment.

FIG. 14 is a flow showing communication processing performed by terminal 10 according to the present embodiment.

In step S1, communicator 11 establishes a wireless connection with access point 30. At this time, communicator 11 acquires a GTK (corresponding to a first group key) from access point 30.

In step S2, controller 23 receives a broadcast packet transmitted from access point 30.

In step S3, determiner 21 determines whether the broadcast packet received in step S2 can be decrypted as a result of decrypter 22 performing decryption processing. If it is determined that the broadcast packet can be decrypted (Yes in step S3), the processing returns to step S2 and continues. Otherwise (No in step S3), the processing proceeds to step S4.

In step S4, updater 24 disconnects the wireless connection with access point 30.

In step S5, after the wireless connection has been disconnected in step S4, updater 24 performs establishment processing of establishing a new wireless connection with access point 30 within a predetermined period. At this time, updater 24 acquires a new GTK (corresponding to a second group key) used in the new wireless connection.

In step S6, updater 24 stores the GTK acquired in step S5 in key management table 28 so as to update key management table 28. After step S6 has been performed, the processing proceeds to step S2.

Figure 15:
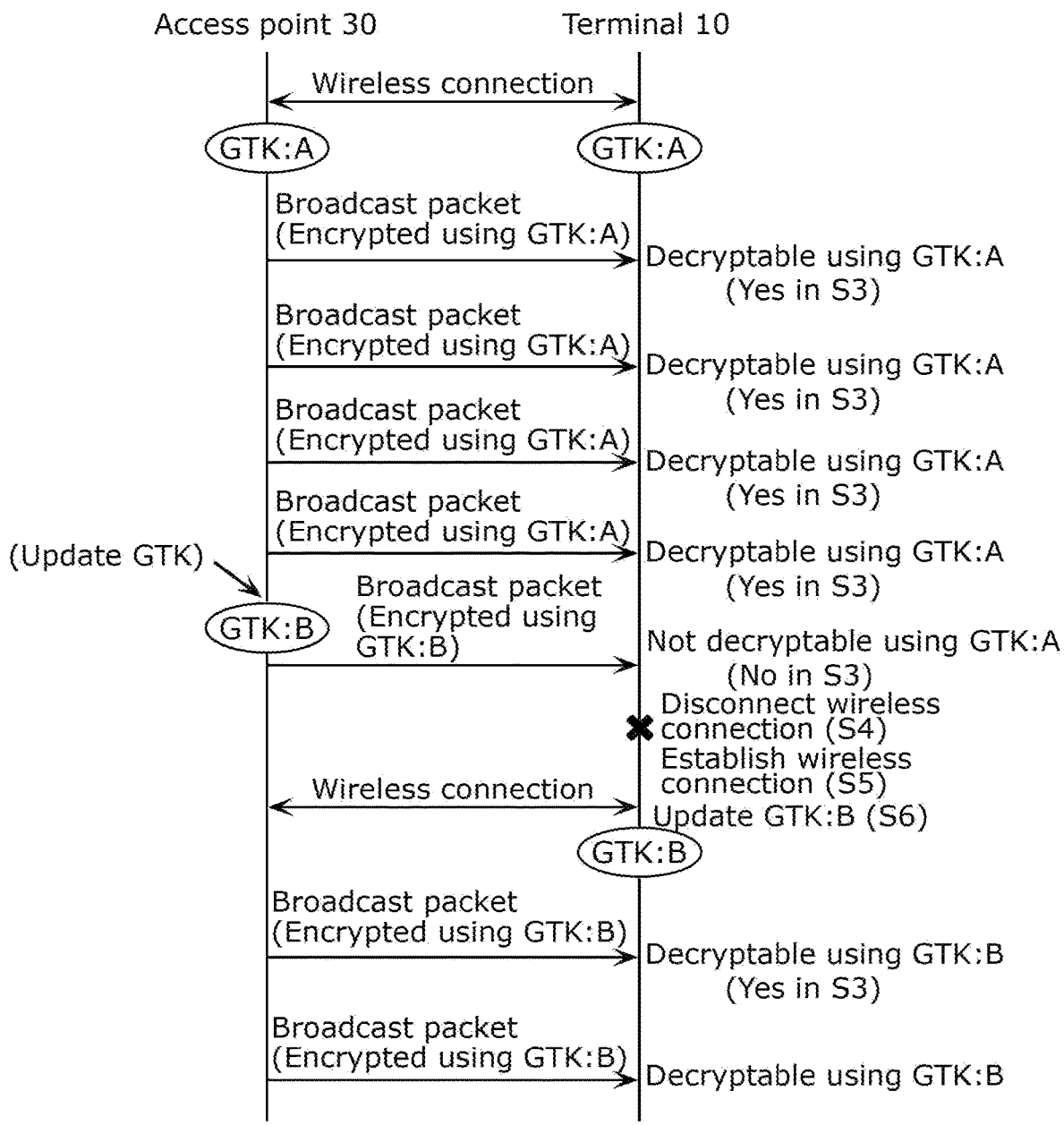
FIG. 15 is a sequence diagram showing a first operation performed by the communication system according to the embodiment.

FIG. 15 is a sequence diagram showing communication performed in communication system 1 according to the present embodiment. The operations performed by communication system 1 will be described with reference to the sequence diagram shown in FIG. 15.

In FIG. 15, upon establishing a wireless connection between access point 30 and terminal 10, terminal 10 acquires GTK:A (corresponding to a first group key) (step S1). As a result, terminal 10 has GTK:A as the group key.

After that, access point 30 repeatedly transmits a broadcast packet encrypted by using GTK:A. Each time terminal 10 receives the broadcast packet that is repeatedly transmitted, terminal 10 performs decryption processing on the received broadcast packet, and determines that the received broadcast packet can be decrypted by using GTK:A (Yes in step S3).

Here, it is assumed that an event occurs in which access point 30 has updated the GTK, but does not transmit the updated GTK to terminal 10. After that, access point 30 has GTK:B as the group key, and transmits a broadcast packet encrypted by using GTK:B to terminal 10.

Terminal 10 that has received the broadcast packet transmitted from access point 30 after access point 30 updated the group key performs decryption processing on the received broadcast packet by using GTK:A. However, a decrypted packet obtained through the decryption processing is not a predetermined broadcast packet, and thus it is determined that the received broadcast packet cannot be decrypted (No in step S3).

After that, terminal 10 disconnects the wireless connection (step S4), and after that, establishes a wireless connection so as to acquire GTK:B (corresponding to a second group key) so as to update the group key (step S6).

After the group key has been updated, terminal 10 can decrypt, by using GTK:B, the broadcast packet encrypted with GTK:B and transmitted by access point 30 (Yes in step S3).

(2) Second Operation

In the second operation, an operation in the case where the broadcast packets used in the first operation are DHCP ACK packets and communication that uses ping is attempted will be described. Here, some of the functions of controller 23 and determiner 21 correspond to a widely used DHCP client application.

Figure 16:
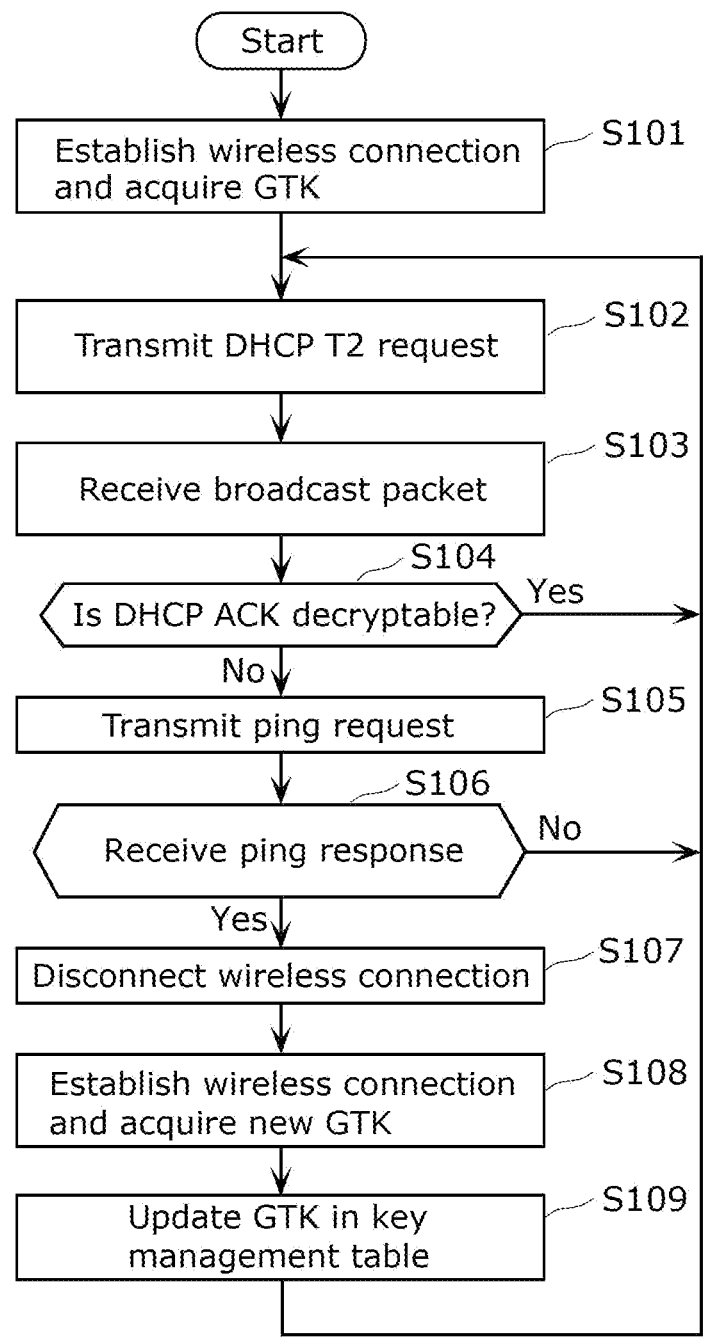
FIG. 16 is a flow diagram showing a second operation performed by the terminal according to the embodiment.

FIG. 16 is a flow showing communication processing performed by terminal 10 according to the present embodiment.

In step S101, communicator 11 establishes a wireless connection with access point 30. At this time, communicator 11 acquires a GTK (corresponding to a first group key) from access point 30.

In step S102, controller 23 transmits a DHCP T2 request packet to access point 30 from communicator 11.

In step S103, controller 23 determines whether a broadcast packet transmitted from access point 30 has been received as a response to the DHCP T2 request packet transmitted in step S102. The broadcast packet may be a DHCP ACK packet transmitted from the DHCP server in response to the DHCP T2 request packet transmitted in step S102. If it is determined that the broadcast packet has been received (Yes in step S103), the processing proceeds to step S104. Otherwise (No in step S103), the processing proceeds to step S105.

In step S104, determiner 21 determines whether the DHCP ACK packet can be decrypted as a result of decrypter 22 performing decryption processing on the broadcast packet received in step S103. If it is determined that the DHCP ACK packet can be decrypted (Yes in step S104), the processing returns to step S102 and continues. Otherwise (No in step S104), the processing proceeds to step S105. In the DHCP client application, this determination is made by determining whether a DHCP ACK packet transmitted from the DHCP server in response to the DHCP T2 request packet transmitted in step S102 has been received within a predetermined period.

In step S105, determiner 21 transmits a ping request (Echo request) to access point 30.

In step S106, determiner 21 determines whether a ping response has been received from access point 30. The received ping response is obtained from access point 30 as a response to the ping request transmitted in step S105. If it is determined that a ping response has been received (Yes in step S106), the processing proceeds to step S107. Otherwise (No in step S106), the processing returns to step S102 and continues.

In step S107, updater 24 disconnects the wireless connection with access point 30.

In step S108, updater 24 performs establishment processing of establishing a new wireless connection with access point 30 within a predetermined period after disconnecting the wireless connection in step S107. At this time, updater 24 acquires a new GTK (corresponding to a second group key) used in the new wireless connection.

In step S109, updater 24 stores the GTK acquired in step S108 in key management table 28 so as to update key management table 28. After step S109 has been performed, the processing proceeds to step S102.

Figure 17:
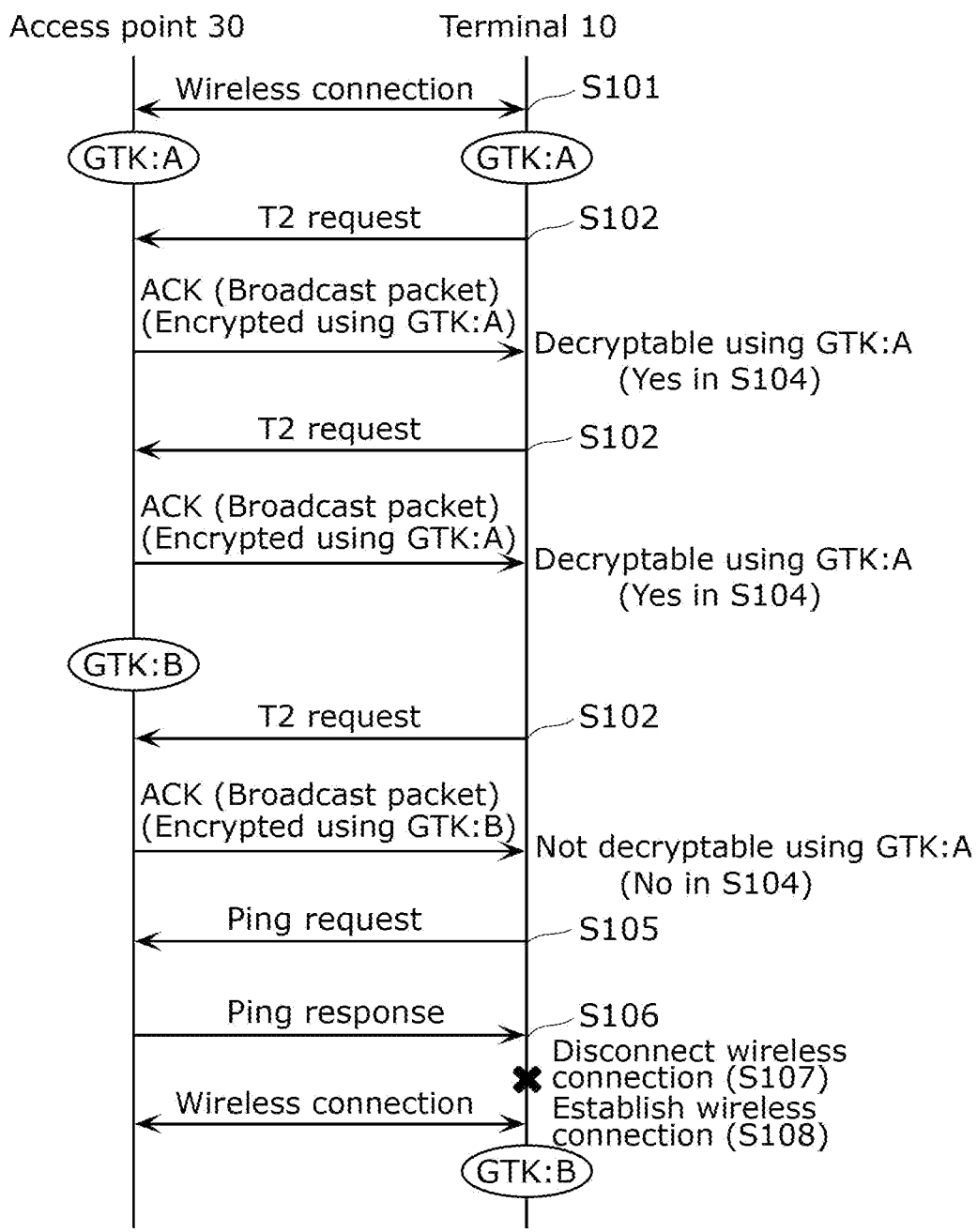
FIG. 17 is a sequence diagram showing a second operation performed by the communication system according to the embodiment.

FIG. 17 is a sequence diagram showing communication performed in communication system 1 according to the present embodiment. The operations performed by communication system 1 will be described with reference to the sequence diagram shown in FIG. 17.

In FIG. 17, upon establishing a wireless connection between access point 30 and terminal 10, terminal 10 acquires GTK:A (corresponding to a first group key) (step S101). As a result, terminal 10 has GTK:A as the group key.

After that, terminal 10 repeatedly transmits a DHCP T2 request packet to access point 30 (step S102), and access point 30 repeatedly transmits a DHCP ACK packet encrypted by using GTK:A. Each time terminal 10 receives the DHCP ACK packet that is repeatedly transmitted, terminal 10 performs decryption processing on the received DHCP ACK packet, and determines that the received DHCP ACK packet can be decrypted by using GTK:A (Yes in step S104).

Here, it is assumed that an event occurs in which access point 30 has updated the GTK, but does not transmit the updated GTK to terminal 10. After that, access point 30 has GTK:B as the group key, and transmits a DHCP ACK packet encrypted by using GTK:B to terminal 10.

Terminal 10 that has received the DHCP ACK packet transmitted from access point 30 after access point 30 updated the group key performs decryption processing on the received DHCP ACK packet by using GTK:A. However, it is not possible to obtain a decrypted DHCP ACK packet as a result of the decryption processing, and thus it is determined that the received DHCP ACK packet cannot be decrypted (No in step S104).

Next, terminal 10 transmits a ping request, and receives a ping response that is a response to the ping request, as a result of which, terminal 10 recognizes that access point 30 is capable of communication (Yes in step S106).

After that, terminal 10 disconnects the wireless connection (step S107). After that, terminal 10 establishes a wireless connection so as to acquire GTK:B (corresponding to a second group key) so as to update the group key (steps S108 and S109).

After the group key has been updated, terminal 10 can receive a DHCP ACK packet encrypted with GTK:B and transmitted by access point 30, and decrypt the DHCP ACK packet by using GTK:B.

(3) Third Operation

Figure 18:
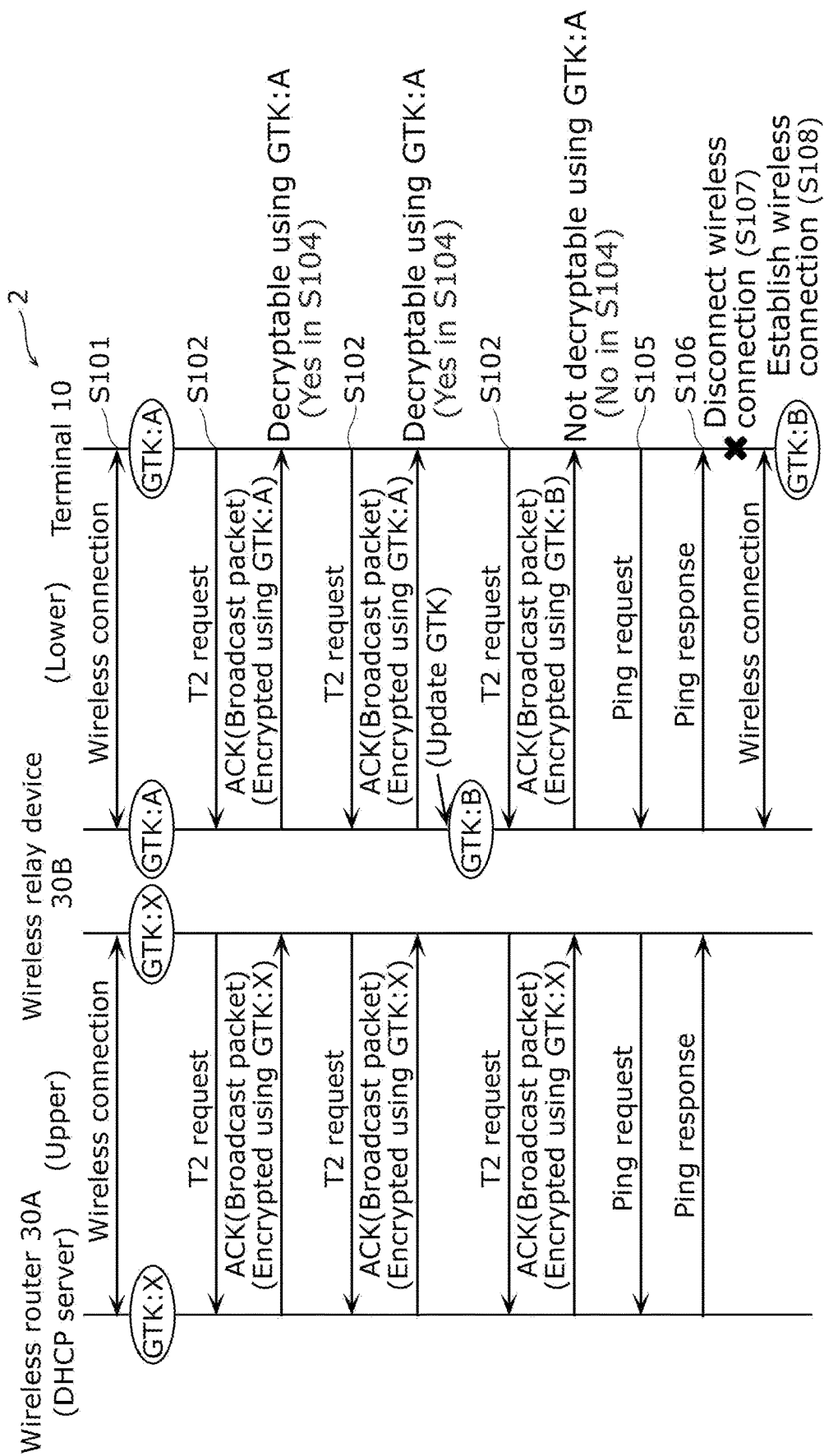
FIG. 18 is a sequence diagram showing a third operation performed by the communication system according to the embodiment.

FIG. 18 is a sequence diagram showing a third operation performed by the communication system according to the present embodiment. The operation performed by communication system 2 that includes: wireless router 30A that functions as access point 30; wireless relay device 30B that functions as access point 30; and terminal 10 will be described with reference to FIG. 18. Here, DHCP server 34 is included in wireless router 30A, and is not included in wireless relay device 30B.

As shown in FIG. 18, in the case where there are two devices that function as access points 30, the destination of a DHCP T2 request transmitted from terminal 10 is wireless router 30A that includes DHCP server 34. Also, likewise, the destination of a ping request transmitted from terminal 10 is wireless router 30A that includes DHCP server 34.

Other than the above, the operation is the same as that shown in FIG. 17, and thus a detailed description thereof is omitted.

Variation 1

In the present variation, a case will be described in which the broadcast packet received by the terminal is a broadcast packet transmitted from another terminal that is connected to the wireless relay device.

Figure 19:
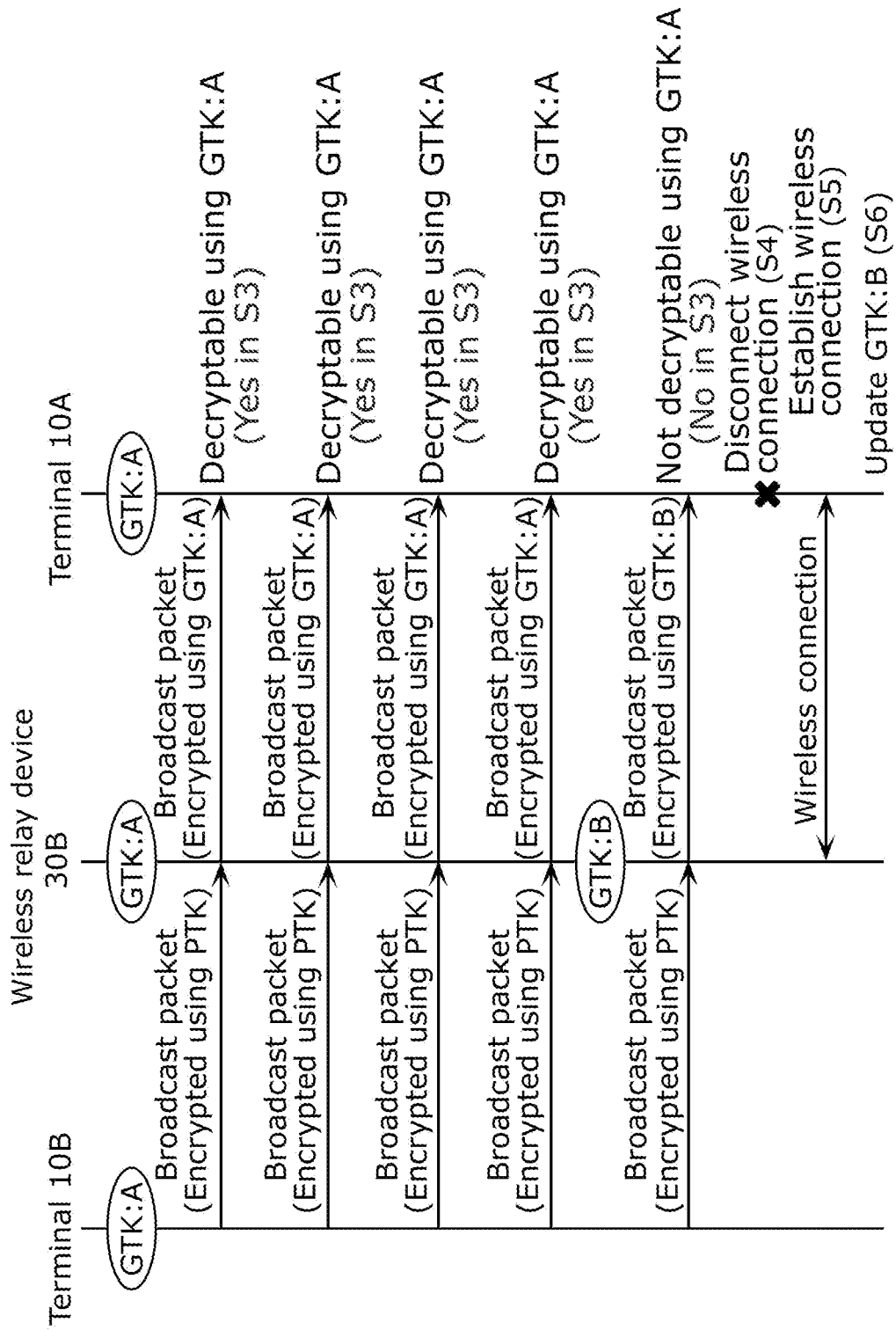
FIG. 19 is a sequence diagram showing operations performed by a communication system according to Variation 1 of the embodiment.

FIG. 19 is a sequence diagram showing the operations performed by a communication system according to the present variation. The sequence diagram shown in FIG. 19 shows a state in which, in (1) First Operation (see FIG. 15) described in the embodiment given above, the broadcast packets received by terminal 10 are broadcast packets transmitted from another terminal that is connected to access point 30 and transferred by access point 30.

In this case, the broadcast packet of a pre-set type used by determiner 21 in the second determination is a broadcast packet of a pre-set type transmitted from another terminal 10B that is in wireless communication with access point 30 and transferred by access point 30. Also, the predetermined period during which the broadcast packet needs to be received, may be set to within several seconds to several minutes from the time at which another terminal 10B transmitted a broadcast packet. The time at which another terminal 10B transmits a broadcast packet may be acquired by sharing information with another terminal 10B, or may be acquired by calculating, based on the reception time of the broadcast packet actually transmitted by another terminal 10B on a regular basis, the frequency and the timing thereof.

As shown in FIG. 19, terminal 10A receives a broadcast packet encrypted by access point 30 by using GTK:A. The broadcast packet is a broadcast packet transmitted from another terminal 10B that is connected to access point 30.

Upon receiving the broadcast packet, terminal 10A determines whether a decrypted packet obtained as a result of decryption processing being performed on the received broadcast packet is a broadcast packet transmitted from terminal 10B.

Other than the above, the operation is the same as that of the embodiment, and thus a description thereof is omitted.

Variation 2

Figure 20:
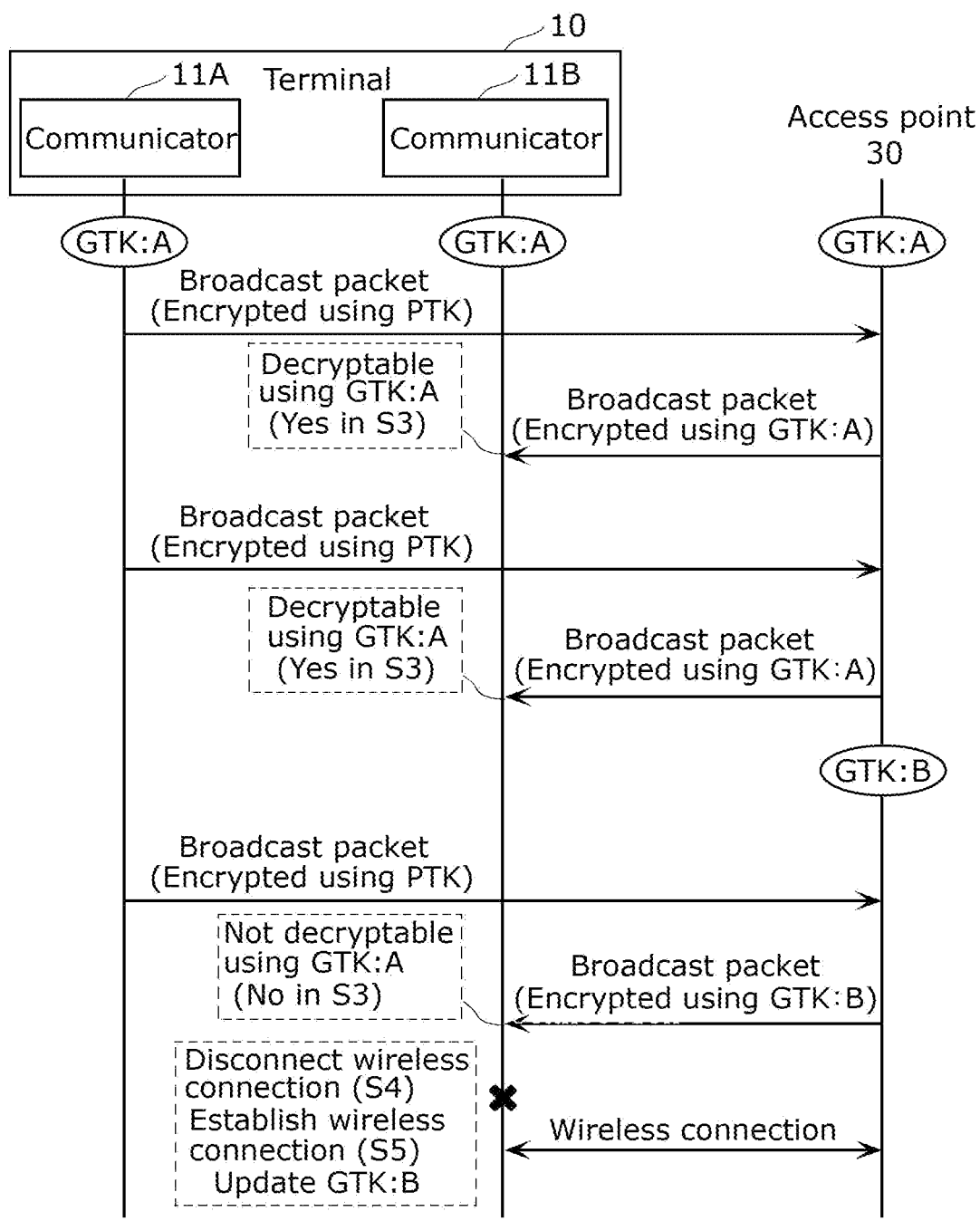
FIG. 20 is a sequence diagram showing operations performed by a communication system according to Variation 2 of the embodiment.

FIG. 20 is a sequence diagram showing the operations performed by a communication system according to the present variation.

In the present variation, a case will be described where terminal 10 includes two communicators of different communication standards, one of which transmits broadcast packets and the other of which receives the transmitted broadcast packets transferred by an access point, and the other communicator uses the received broadcast packets.

The sequence diagram shown in FIG. 20 shows a state in which, in (1) First Operation (see FIG. 15) described in the embodiment given above, the broadcast packets received by terminal 10 are broadcast packets transmitted from another communicator included in terminal 10 and transferred by access point 30.

In this case, the broadcast packet of a pre-set type used by determiner 21 in the second determination is a broadcast packet of a pre-set type transmitted from another communicator included in terminal 10 and transferred by access point 30.

As shown in FIG. 20, terminal 10 includes two communicators 11A and 11B.

Communicator 11B receives a broadcast packet encrypted by access point 30. The broadcast packet is a broadcast packet transmitted from communicator 11A. In this case, terminal 10 has the content of the broadcast packet transmitted from communicator 11A, and determines whether a decrypted packet obtained as a result of decryption processing being performed on the broadcast packet received by communicator 11B is a broadcast packet transmitted from communicator 11A.

Other than the above, the operation is the same as that of the embodiment, and thus a description thereof is omitted.

Variation 3

Figure 21:
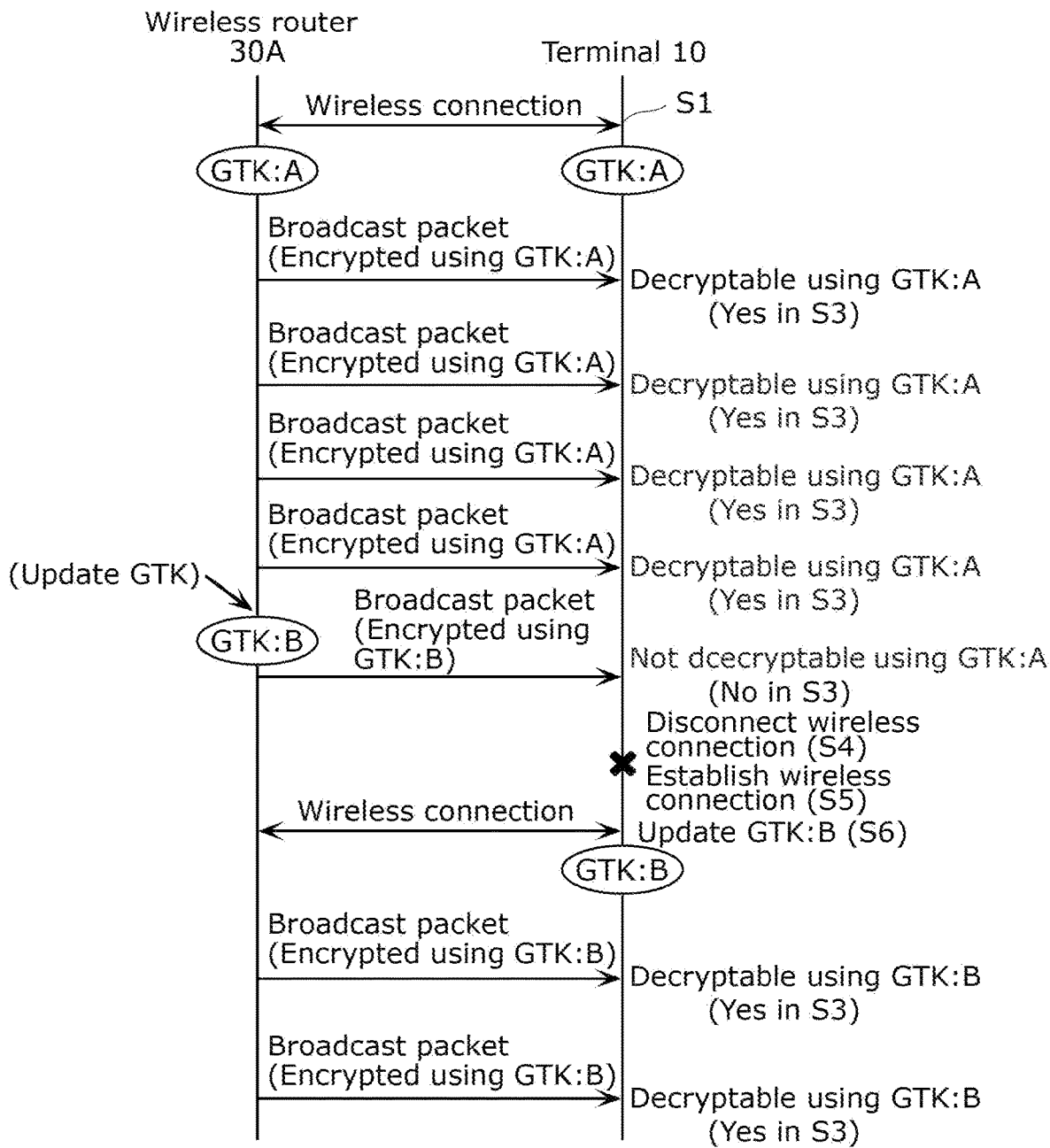
FIG. 21 is a sequence diagram showing a first operation performed by a communication system according to Variation 3 of the embodiment.
Figure 22:
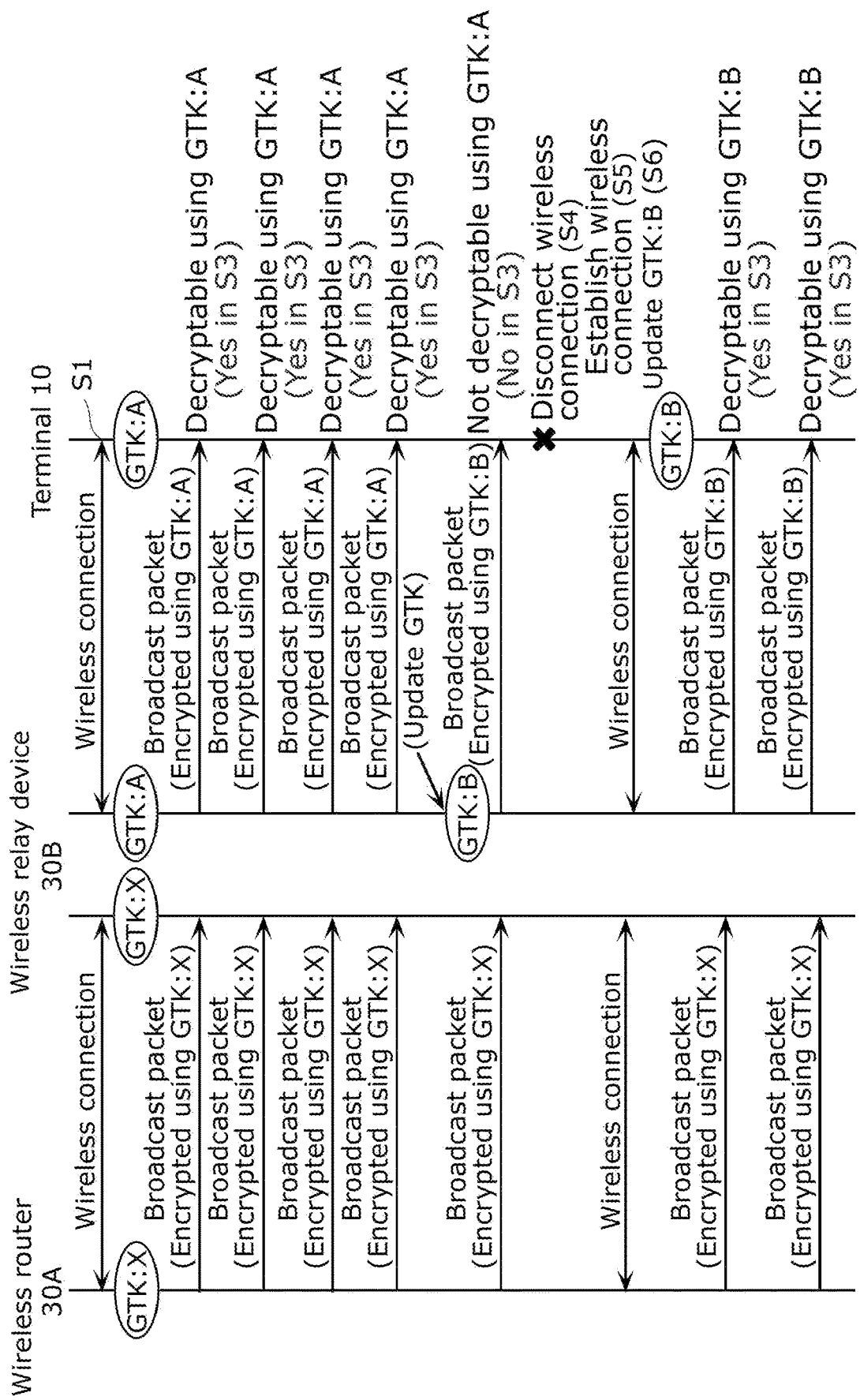
FIG. 22 is a sequence diagram showing a second operation performed by the communication system according to Variation 3 of the embodiment.

FIGS. 21 and 22 are sequence diagrams showing the operations performed by a communication system according to the present variation.

In the present variation, a case will be described where access point 30 is wireless router 30A that has a function of repeatedly transmitting a broadcast packet. As an example, an ssdp:alive packet can be used that is transmitted in a multicast manner on a regular basis when wireless router 30A has UPnP (Universal Plug and Play)-IGD (Internet Gateway Device) function.

FIG. 21 is a sequence diagram showing a first operation performed by the communication system according to the present variation. The sequence diagram shown in FIG. 21 shows a state in which, in (1) First Operation (see FIG. 15) described in the embodiment given above, the broadcast packets received by terminal 10 are ssdp:alive packets that are multicast packets transmitted by wireless router 30A on a regular basis. Also, FIG. 21 shows a state in which terminal 10 is connected to wireless router 30A without using a wireless relay device.

In this case, the broadcast packet of a pre-set type used by determiner 21 in the second determination is an ssdp:alive packet transmitted from wireless router 30A. Also, the predetermined period during which the broadcast packet needs to be received, can be set to within several seconds to several minutes from the time determined in advance as the time at which wireless router 30A transmits an ssdp:alive packet. The time at which wireless router 30A transmits an ssdp:alive packet can be acquired by calculating, based on the reception time of the ssdp:alive packet actually transmitted by wireless router 30A on a regular basis, the frequency and the timing thereof.

As shown in FIG. 21, terminal 10 receives an ssdp:alive packet that is a multicast packet encrypted by wireless router 30A by using GTK:A. In this case, terminal 10 determines whether a decrypted packet obtained as a result of decryption processing being performed on the received ssdp:alive packet is an ssdp:alive packet.

Other than the above, the operation is the same as that of the embodiment, and thus a description thereof is omitted.

FIG. 22 is a sequence diagram showing a second operation performed by the communication system according to the present variation. The sequence diagram shown in FIG. 22 shows a state in which, in (1) First Operation (see FIG. 15) described in the embodiment given above, the broadcast packets received by terminal 10 are ssdp:alive packets that are multicast packets transmitted from wireless router 30A and transferred by wireless relay device 30B. In FIG. 22, terminal 10 is connected to wireless router 30A via wireless relay device 30B.

As shown in FIG. 22, terminal 10 receives an ssdp:alive packet that is a broadcast packet transmitted from wireless router 30A and encrypted by wireless relay device 30B by using GTK:A. In this case, terminal 10 determines whether a decrypted packet obtained as a result of decryption processing being performed on the received ssdp:alive packet is an ssdp:alive packet.

FIG. 22 shows the case where the GTK of wireless relay device 30B is updated, but terminal 10 operates in the same manner even when the GTK of wireless router 30A has been updated.

Other than the above, the operation is the same as that of the embodiment, and thus a description thereof is omitted.

As described above, with the terminal according to the present embodiment, when it is not possible to decrypt a broadcast packet (or in other words, packet in broadcast in a broad sense) received from the access point by using the first group key, the terminal can carry out the processing for updating the group key based on generated information. The situation where it is not possible to decrypt the broadcast packet by using the first group key occurs when the access point performs a behavior that updates the group key, but does not transmit the updated group key to the terminal. When the access point performs the above-described behavior, the terminal carries out the processing for updating the group key, as a result of which, the terminal can acquire the updated group key, and thus a state can be achieved in which the broadcast packet transmitted by the access point can be decrypted. As described above, with the terminal, when it is not possible to decrypt the broadcast packet received from the access point, a state can be achieved in which the broadcast packet can be decrypted.

Also, if it is determined that the group key needs to be updated, the terminal disconnects the wireless connection and then establishes a new wireless connection so as to update the group key. Accordingly, the group key can be updated by using the existing wireless communication processing without having to perform processing dedicated to update the group key. Thus, with the terminal, when it is not possible to decrypt the broadcast packet received from the access point, by performing processing that uses the existing wireless communication processing, a state can be achieved in which the broadcast packet can be decrypted.

Also, the terminal monitors whether the state in which the broadcast packet received from the access point can be decrypted is maintained, and if it is determined that the state in which the broadcast packet received from the access point can be decrypted is not maintained, the terminal can promptly detect that fact and perform the processing for updating the group key. Accordingly, when it is not possible to decrypt the broadcast packet received from the access point, the terminal can promptly detect that fact, and thus a state can be achieved in which the broadcast packet can be decrypted.

Also, the terminal has stored the broadcast packet of a pre-set type that needs to be received, and determines whether the received broadcast packet can be decrypted based on whether the packet obtained through decryption is the packet of a pre-set type. Accordingly, with the terminal, it is possible to more easily achieve a state in which the broadcast packet received from the access point can be decrypted.

Also, the terminal causes the access point to transmit a broadcast packet by using a DHCP protocol message. Specifically, the access point is caused to transmit a broadcast packet by utilizing a conventional mechanism of DHCP protocol in which when a DHCP server receives a DHCP T2 request packet whose broadcast flag is True, the DHCP server transmits a DHCP ACK packet in a broadcast manner. Accordingly, with the terminal, it is possible to more easily achieve a state in which the broadcast packet received from the access point can be decrypted by utilizing the existing DHCP protocol.

Also, the terminal can repeatedly transmit the DHCP ACK packet to the access point, as a result of which, the terminal can repeatedly receive the DHCP ACK packet that is a broadcast packet from the access point. With this configuration, the terminal monitors whether the state in which the broadcast packet received from the access point can be decrypted is maintained, and if it is determined that the state in which the broadcast packet received from the access point can be decrypted is not maintained, a state can be achieved in which the broadcast packet can be decrypted. Accordingly, it is possible to more promptly achieve a state in which the broadcast packet received from the access point can be decrypted by utilizing the existing DHCP protocol.

Also, the terminal causes the access point to transmit a broadcast packet by utilizing the transmission of a broadcast packet by another terminal that is connected to the access point. Accordingly, with the terminal, it is possible to more easily achieve a state in which the broadcast packet received from the access point can be decrypted by utilizing another terminal.

Also, the terminal carries out the processing for updating the group key even when the terminal does not receive a broadcast packet that needs to be received during the predetermined period. Depending on the implementation specifications of the communicator, when a received broadcast packet cannot be successfully decrypted by using the group key stored in the terminal, it may be determined that the broadcast packet is not received. In this case, the processor can know, based on the fact that no broadcast packet has been received during the predetermined period during which the broadcast packet needs to be received, that decryption of a broadcast packet cannot be performed. Accordingly, with the terminal, irrespective of the implementation specifications of the communicator, a state can be achieved in which the broadcast packet received from the access point can be decrypted.

Also, in the case where the terminal knows, based on the fact that no broadcast packet has been received during the predetermined period during which the broadcast packet needs to be received, that decryption of a broadcast packet cannot be performed, the broadcast packet transmission source device may stop operating. In this case, the terminal should not update the group key. Accordingly, by configuring the terminal to attempt communication with the transmission source device, and proceed to the processing for updating the group key only when it is determined that the transmission source device is capable of communication, or in other words, the transmission source device does not stop operating, as a result of which, the group key can be updated more appropriately. Thus, a state can be achieved in which the broadcast packet received from the access point can be decrypted, while avoiding a situation where the group key is updated when it is unnecessary to update the group key.

In the embodiment given above, the structural elements may be configured by dedicated hardware or may be implemented by executing a software program suitable for the structural elements. The structural elements may be implemented by a program executor such as a CPU or a processor reading and executing the software program recorded in a recording medium such as a hard disk or a semiconductor memory. Here, the software that implements the terminal and the like of the embodiment given above may be a program as described below.

Specifically, the program is a program that causes a computer to execute a communication method executed by a terminal, the terminal including: a communicator that wirelessly performs encrypted communication with an access point; a processor; and a memory that stores at least one program executed by the processor and a key management table for storing a group key for the encrypted communication, the communication method, including: by the processor, acquiring the group key for the encrypted communication from the access point and storing the group key acquired in the key management table as a first group key; receiving a broadcast packet encrypted by the access point via the communicator; making a first determination as to whether the broadcast packet received is decryptable by using the first group key; and when it is determined, in the first determination, that the broadcast packet is not decryptable by using the first group key, generating information indicating that the first group key needs to be updated.

Up to here, the terminal and the like according to one or more aspects of the present invention have been described above by way of an embodiment, but the present invention is not limited to the embodiment given above. Other embodiments obtained by making various modifications that can be conceived by a person having ordinary skill in the art to the above embodiment as well as embodiments constructed by combining structural elements of different embodiments without departing from the gist of the present disclosure may also be encompassed within the scope of the one or more aspects of the present invention.

INDUSTRIAL APPLICABILITY

The one or more exemplary embodiments of the present invention disclosed herein are applicable to a terminal that is connected to an access point for wireless communication such as a smartphone, a personal computer, an electric household appliance, industrial equipment, office equipment, or the like.

The invention claimed is:

1. A terminal, comprising:
  a wireless communication interface device that wirelessly performs encrypted communication with an access point;
  a processor; and
  a memory that stores at least one program executed by the processor and a key management table for storing a group key for the encrypted communication,
  wherein the processor performs:
  acquiring the group key for the encrypted communication from the access point and storing the group key acquired in the key management table as a first group key;
  receiving a broadcast packet encrypted by the access point via the wireless communication interface device;
  making a first determination as to whether the broadcast packet received is decryptable by using the first group key; and
  when it is determined, in the first determination, that the broadcast packet is not decryptable by using the first group key:
    disconnecting a wireless connection with the access point;

after the wireless connection with the access point is disconnected, performing establishment processing of establishing a new wireless connection with the access point via the wireless communication interface device within a predetermined period; and storing a group key for encrypted communication used in the new wireless connection acquired through the establishment processing in the key management table as a second group key so as to update the first group key to the second group key without having to perform processing dedicated to update the first group key to the second group key.

2. The terminal according to claim 1,
wherein the processor performs:
repeatedly receiving the broadcast packet encrypted by the access point; and
making the first determination for each of the broadcast packet repeatedly received.

3. The terminal according to claim 1,
wherein the processor performs:
in the first determination, decryption processing for decrypting the broadcast packet received by using the first group key;
making a second determination as to whether a decrypted packet obtained through the decryption processing is a broadcast packet of a first type that is pre-set; and
when it is determined, in the second determination, that the decrypted packet is the broadcast packet of the first type, determining that the broadcast packet is decryptable by using the first group key.

4. The terminal according to claim 3,
wherein the processor performs:
prior to receiving the broadcast packet, transmitting a Dynamic Host Configuration Protocol (DHCP) T2 request packet whose broadcast flag is True to a DHCP server via the wireless communication interface device, the broadcast packet received being a DHCP ACK packet received from the DHCP server as a response to the DHCP T2 request packet transmitted; and
in the second determination, determining whether the decrypted packet obtained through the decryption processing is a DHCP ACK packet as a broadcast packet of a pre-set type.

5. The terminal according to claim 4,
wherein the processor performs:
repeatedly receiving the DHCP ACK packet by repeatedly transmitting the DHCP T2 request packet.

6. The terminal according to claim 3,
wherein the processor performs:
in the second determination, determining whether the decrypted packet obtained through the decryption processing is a broadcast packet of a pre-set type transmitted by another terminal that is in wireless communication with the access point and transferred by the access point.

7. The terminal according to claim 3,
wherein the processor further performs:
when the broadcast packet is not received within a predetermined period during which the broadcast packet needs to be received, disconnecting the wireless connection with the access point.

8. The terminal according to claim 7,
wherein the processor performs:
when the broadcast packet is not received within the predetermined period, further attempting communication between a transmission source device that transmitted the broadcast packet and the wireless communication interface device so as to determine whether the transmission source device is capable of communication; and
disconnecting the wireless connection with the access point, only when it is determined that the transmission source device is capable of communication.

9. A communication method executed by a terminal,
the terminal including:
a wireless communication interface device that wirelessly performs encrypted communication with an access point;
a processor; and
a memory that stores at least one program executed by the processor and a key management table for storing a group key for the encrypted communication,
the communication method, comprising:
by the processor,
acquiring the group key for the encrypted communication from the access point and storing the group key acquired in the key management table as a first group key;
receiving a broadcast packet encrypted by the access point via the wireless communication interface device;
making a first determination as to whether the broadcast packet received is decryptable by using the first group key; and
when it is determined, in the first determination, that the broadcast packet is not decryptable by using the first group key:
disconnecting a wireless connection with the access point;
after the wireless connection with the access point is disconnected, performing establishment processing of establishing a new wireless connection with the access point via the wireless communication interface device within a predetermined period; and
storing a group key for encrypted communication used in the new wireless connection acquired through the establishment processing in the key management table as a second group key so as to update the first group key to the second group key without having to perform processing dedicated to update the first group key to the second group key.

10. A non-transitory computer-readable recording medium in which a program for causing a computer to execute a communication method using a terminal,
the terminal including:
a wireless communication interface device that wirelessly performs encrypted communication with an access point;
a processor; and
a memory that stores at least one program executed by the processor and a key management table for storing a group key for the encrypted communication,
the communication method, comprising:
by the processor,
acquiring the group key for the encrypted communication from the access point and storing the group key acquired in the key management table as a first group key;
receiving a broadcast packet encrypted by the access point via the wireless communication interface device;
making a first determination as to whether the broadcast packet received is decryptable by using the first group key; and when it is determined, in the first determination, that the broadcast packet is not decryptable by using the first group key:
  disconnecting a wireless connection with the access point;
  after the wireless connection with the access point is disconnected, performing establishment processing of establishing a new wireless connection with the access point via the wireless communication interface device within a predetermined period; and
  storing a group key for encrypted communication used in the new wireless connection acquired through the establishment processing in the key management table as a second group key so as to update the first group key to the second group key without having to perform processing dedicated to update the first group key to the second group key.

* * * * *